United States Patent
Goel et al.

(10) Patent No.: US 11,895,730 B2
(45) Date of Patent: Feb. 6, 2024

(54) TECHNIQUES FOR USER EQUIPMENT DETERMINATION OF CONNECTED MODE DISCONTINUOUS RECEPTION CONFIGURATION WITH MULTIPLE APPLICATIONS

(71) Applicant: QUALCOMM Incorporated, San Diego, CA (US)

(72) Inventors: Satashu Goel, San Diego, CA (US); Arvind Vardarajan Santhanam, San Diego, CA (US); Reza Shahidi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/443,881

(22) Filed: Jul. 28, 2021

(65) Prior Publication Data
US 2022/0053594 A1  Feb. 17, 2022

Related U.S. Application Data

(60) Provisional application No. 62/706,347, filed on Aug. 11, 2020.

(51) Int. Cl.
*H04W 76/28* (2018.01)
*H04W 52/02* (2009.01)

(52) U.S. Cl.
CPC .................. *H04W 76/28* (2018.02)

(58) Field of Classification Search
CPC ............. H04W 76/28; H04W 52/0216; H04W 52/0248; Y02D 30/70
(Continued)

(56) References Cited

U.S. PATENT DOCUMENTS 9,906,977 B2  2/2018 Tabet et al.
10,021,649 B2  7/2018 Manepalli et al.
(Continued)

OTHER PUBLICATIONS

"3rd Generation Partnership Project; Technical Specification Group Radio Access Network; NR; Study on User Equipment (UE) Power Saving in NR (Release 16)", 3GPP Standard; Technical Report, 3GPP TR38.840, 3rd Generation Partnership Project(3GPP), Mobile Competence Centre, 650, Route Des Lucioles, F-06921, Sophia-Antipolis Cedex, France, No. V16.0.0, Jun. 24, 2019 (Jun. 24, 2019), pp. 1-74, XP051754330, [retrieved on Jun. 24, 2019] Paragraph 5 .1. 4.

(Continued)

*Primary Examiner* — Inder P Mehra
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, at a modem from an application processor, sets of values for connected mode discontinuous reception (C-DRX) configuration parameters, each of the sets of values for the C-DRX configuration parameters being associated with a corresponding one of a plurality of active applications. The UE may determine a set of selected values for the C-DRX configuration parameters based at least in part on the sets of values. The determination of the set of selected values may include identifying an extremum value for a first C-DRX configuration parameter among the sets of values and determining a selected value for the first C-DRX configuration parameter as the extremum value. The UE may transmit a request indicating the set of selected values for the C-DRX configuration parameters. Numerous other aspects are provided.

30 Claims, 13 Drawing Sheets

(58) Field of Classification Search
USPC .......................................................... 370/328
See application file for complete search history.

(56) References Cited

U.S. PATENT DOCUMENTS

| | | | |
|---|---|---|---|
| 10,412,780 B2 | 9/2019 | Manepalli et al. | |
| 10,869,271 B2 * | 12/2020 | Jeong ................ | H04W 52/0235 |
| 2013/0308513 A1 * | 11/2013 | Jheng ................ | H04W 52/0216 |
| | | | 370/311 |
| 2017/0318536 A1 * | 11/2017 | Manepalli ............. | H04W 24/02 |
| 2018/0343686 A1 * | 11/2018 | Manepalli ............. | H04W 76/28 |
| 2019/0191477 A1 * | 6/2019 | Jang ..................... | H04B 5/0025 |
| 2020/0252875 A1 * | 8/2020 | Qiu ................... | H04W 52/0248 |
| 2020/0383147 A1 * | 12/2020 | Yoon ................... | H04L 27/2607 |

OTHER PUBLICATIONS

International Search Report and Written Opinion—PCT/US2021/071058—ISA/EPO—dated Nov. 9, 2021.

* cited by examiner

| Application ID | C-DRX configuration parameters ||||  Priority (optional) |
| | Inactivity timer (ms) | Long cycle (ms) | Short cycle (ms) | Short cycle timer | |
| --- | --- | --- | --- | --- | --- |
| App1 | a1 | b1 | c1 | d1 | 1 |
| App2 | a2 | b2 | c2 | d2 | 2 |
| App3 | a3 | b3 | c3 | d3 | 3 |
| App4 | a4 | b4 | c4 | d4 | 4 |

FIG. 3B

TECHNIQUES FOR USER EQUIPMENT DETERMINATION OF CONNECTED MODE DISCONTINUOUS RECEPTION CONFIGURATION WITH MULTIPLE APPLICATIONS

CROSS-REFERENCE TO RELATED APPLICATION

This Patent Application claims priority to U.S. Provisional Patent Application No. 62/706,347, filed on Aug. 11, 2020, entitled "TECHNIQUES FOR USER EQUIPMENT DETERMINATION OF CONNECTED MODE DISCONTINUOUS RECEPTION CONFIGURATION WITH MULTIPLE APPLICATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for user equipment (UE) determination of connected mode discontinuous reception (C-DRX) configuration with multiple applications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving, at a modem from an application processor, sets of values for connected mode discontinuous reception (C-DRX) configuration parameters, each of the sets of values for the C-DRX configuration parameters being associated with a corresponding one of a plurality of active applications operating on the UE; determining a set of selected values for the C-DRX configuration parameters based at least in part on the sets of values for the C-DRX configuration parameters, wherein determining the set of selected values comprises: identifying an extremum value for a first C-DRX configuration parameter among the sets of values, and determining a selected value for the first C-DRX configuration parameter as the extremum value for the first C-DRX configuration parameter; and transmitting a request indicating the set of selected values for the C-DRX configuration parameters.

In some aspects, the method includes identifying an application operating on the UE as an active application, the application being one of the plurality of active applications, wherein the identification of the application as an active application comprises: determining a characteristic of the application; and identifying the application as an active application based at least in part on the characteristic of the application.

In some aspects, the identification of the application as an active application based at least in part on the characteristic comprises: determining that the characteristic associated with the application satisfies a threshold associated with the characteristic; and identifying the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the extremum value for the first C-DRX configuration parameter among the sets of values is a maximum value for the first C-DRX configuration parameter among the sets of values.

In some aspects, the first C-DRX configuration parameter is an inactivity timer.

In some aspects, the extremum value for the first C-DRX configuration parameter among the sets of values is a minimum value for the first C-DRX configuration parameter among the sets of values.

In some aspects, the first C-DRX configuration parameter is a duration of a long DRX cycle.

In some aspects, the determination of the set of selected values for the C-DRX configuration parameters comprises: determining a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the determination of the set of selected values for the C-DRX configuration parameters comprises: identifying one or more active applications of the plurality of active applications that have a highest priority value; and determining the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the determination of the set of selected values based at least in part on the two or more sets of values comprises determining a selected value for a first C-DRX configuration parameter as a maximum value for the first C-DRX configuration parameter among the two or more sets of values.

In some aspects, the determination of the set of selected values based at least in part on the two or more sets of values comprises determining a selected value for a first C-DRX configuration parameter as a minimum value for the first C-DRX configuration parameter among the two or more sets of values.

In some aspects, the determination of the set of selected values based at least in part on the two or more sets of values comprises: determining a selected value for a first C-DRX configuration parameter based at least in part on the two or more sets of values; and determining a selected value for one or more other C-DRX configuration parameters based at least in part on a set of values, of the two or more sets of values, that includes the selected value for the first C-DRX configuration parameter.

In some aspects, the set of selected values is a set of default values for the C-DRX configuration parameters.

In some aspects, the set of default values is associated with at least one of a public land mobile network, a tracking area code, a cell identifier, or a location of the UE.

In some aspects, the determination of the set of selected values for the C-DRX configuration parameters comprises: determining a first set of values based at least in part on the sets of values; determining that the first set of values is not supported by a network associated with the UE; and determining the set of selected values to be a set of default values based at least in part on the determination that the first set of values is not supported by the network.

In some aspects, a method of wireless communication performed by a UE includes: detecting a trigger to update values for C-DRX configuration parameters; determining a set of selected values for the C-DRX configuration parameters based at least in part on the detection of the trigger; and transmitting a request indicating the set of selected values for the C-DRX configuration parameters.

In some aspects, the trigger is a determination that no active applications are operating on the UE.

In some aspects, the determination of the set of selected values comprises determining a set of default values for the C-DRX configuration parameters based at least in part on the determination that no active applications are operating on the UE.

In some aspects, the set of default values is associated with at least one of a public land mobile network, a tracking area code, a cell identifier, or a location of the UE.

In some aspects, the trigger is a determination that an application operating on the UE has become an active application operating on the UE.

In some aspects, the determination of the set of selected values comprises recomputing a set of values for the C-DRX configuration parameters based at least in part on the determination that the application has become an active application.

In some aspects, the trigger is a determination that a state of an active application operating on the UE has changed from a first state to a second state.

In some aspects, the determination of the set of selected values comprises recomputing a set of values for the C-DRX configuration parameters based at least in part on the determination that the state of the active application has changed from the first state to the second state.

In some aspects, a method of wireless communication performed by a UE includes: identifying sets of values for C-DRX configuration parameters, each of the sets of values for the C-DRX configuration parameters being associated with a corresponding one of a plurality of active applications operating on the UE; determining a set of selected values for the C-DRX configuration parameters based at least in part on the sets of values for the C-DRX configuration parameters; and providing the set of selected values for transmission in a request indicating the set of selected values.

In some aspects, the method includes identifying an application operating on the UE as an active application, the application being one of the plurality of active applications, wherein the identification of the application as an active application comprises: determining a characteristic of the application; and identifying the application as an active application based at least in part on the characteristic of the application.

In some aspects, the identification of the application as an active application based at least in part on the characteristic comprises: determining that the characteristic associated with the application satisfies a threshold associated with the characteristic; and identifying the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the determination of the set of selected values for the C-DRX configuration parameters comprises: identifying a maximum value for a first C-DRX configuration parameter among the sets of values; and determining a selected value for the first C-DRX configuration parameter as the maximum value for the first C-DRX configuration parameter.

In some aspects, the first C-DRX configuration parameter is an inactivity timer.

In some aspects, the determination of the set of selected values for the C-DRX configuration parameters comprises: identifying a minimum value for a first C-DRX configuration parameter among the sets of values; and determining a selected value for the first C-DRX configuration parameter as the minimum value for the first C-DRX configuration parameter.

In some aspects, the first C-DRX configuration parameter is a duration of a long DRX cycle.

In some aspects, the determination of the set of selected values for the C-DRX configuration parameters comprises: determining a selected value for a first C-DRX configuration parameter based at least in part on the sets of values; and determining a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the determination of the set of selected values for the C-DRX configuration parameters comprises: identifying one or more active applications of the plurality of active applications that have a highest priority value; and determining the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the determination of the set of selected values based at least in part on the two or more sets of values comprises determining a selected value for a first C-DRX configuration parameter as a maximum value for the first C-DRX configuration parameter among the two or more sets of values.

In some aspects, the determination of the set of selected values based at least in part on the two or more sets of values comprises determining a selected value for a first C-DRX configuration parameter as a minimum value for the first C-DRX configuration parameter among the two or more sets of values.

In some aspects, the determination of the set of selected values based at least in part on the two or more sets of values comprises: determining a selected value for a first C-DRX configuration parameter based at least in part on the two or more sets of values; and determining a selected value for one or more other C-DRX configuration parameters based at least in part on a set of values, of the two or more sets of values, that includes the selected value for the first C-DRX configuration parameter.

In some aspects, the set of selected values is a set of default values for the C-DRX configuration parameters.

In some aspects, the set of default values is associated with at least one of a public land mobile network, a tracking area code, a cell identifier, or a location of the UE.

In some aspects, the determination of the set of selected values for the C-DRX configuration parameters comprises: determining a first set of values based at least in part on the sets of values; determining that the first set of values is not supported by a network associated with the UE; and determining the set of selected values to be a set of default values based at least in part on the determination that the first set of values is not supported by the network.

In some aspects, a method of wireless communication performed by a UE includes: detecting a trigger to update values for C-DRX configuration parameters; determining a set of selected values for the C-DRX configuration parameters based at least in part on the detection of the trigger; and providing the set of selected values for transmission in a request indicating the set of selected values.

In some aspects, the trigger is a determination that no active applications are operating on the UE.

In some aspects, the determination of the set of selected values comprises determining a set of default values for the C-DRX configuration parameters based at least in part on the determination that no active applications are operating on the UE.

In some aspects, the set of default values is associated with at least one of a public land mobile network, a tracking area code, a cell identifier, or a location of the UE.

In some aspects, the trigger is a determination that an application operating on the UE has become an active application operating on the UE.

In some aspects, the determination of the set of selected values comprises recomputing a set of values for the C-DRX configuration parameters based at least in part on the determination that the application has become an active application.

In some aspects, the trigger is a determination that a state of an active application operating on the UE has changed from a first state to a second state.

In some aspects, the determination of the set of selected values comprises recomputing a set of values for the C-DRX configuration parameters based at least in part on the determination that the state of the active application has changed from the first state to the second state.

In some aspects, a UE for wireless communication includes a memory and one or more processors coupled to the memory, the one or more processors configured to: receive, at a modem from an application processor, sets of values for C-DRX configuration parameters, each of the sets of values for the C-DRX configuration parameters being associated with a corresponding one of a plurality of active applications operating on the UE; determine a set of selected values for the C-DRX configuration parameters based at least in part on the sets of values for the C-DRX configuration parameters, wherein the one or more processors, when determining the set of selected values, are to: identify an extremum value for a first C-DRX configuration parameter among the sets of values, and determine a selected value for the first C-DRX configuration parameter as the extremum value for the first C-DRX configuration parameter; and transmit a request indicating the set of selected values for the C-DRX configuration parameters.

In some aspects, the one or more processors are configured to: identify an application operating on the UE as an active application, the application being one of the plurality of active applications, wherein the identification of the application as an active application comprises: determining a characteristic of the application; and identifying the application as an active application based at least in part on the characteristic of the application.

In some aspects, the one or more processors, when identifying the application as an active application based at least in part on the characteristic, are to: determine that the characteristic associated with the application satisfies a threshold associated with the characteristic; and identify the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the extremum value for the first C-DRX configuration parameter among the sets of values is a maximum value for the first C-DRX configuration parameter among the sets of values.

In some aspects, the first C-DRX configuration parameter is an inactivity timer.

In some aspects, the extremum value for the first C-DRX configuration parameter among the sets of values is a minimum value for the first C-DRX configuration parameter among the sets of values.

In some aspects, the first C-DRX configuration parameter is a duration of a long DRX cycle.

In some aspects, the one or more processors, when determining the set of selected values for the C-DRX configuration parameters, are to: determine a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the one or more processors, when determining the set of selected values for the C-DRX configuration parameters, are to: identify one or more active applications of the plurality of active applications that have a highest priority value; and determine the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the one or more processors, when determining the set of selected values based at least in part on the two or more sets of values, are to: determine a selected value for a first C-DRX configuration parameter as a maximum value for the first C-DRX configuration parameter among the two or more sets of values.

In some aspects, the one or more processors are configured to determine a selected value for a first C-DRX configuration parameter as a minimum value for the first C-DRX configuration parameter among the two or more sets of values.

In some aspects, the one or more processors are configured to: determine a selected value for a first C-DRX configuration parameter based at least in part on the two or more sets of values; and determine a selected value for one or more other C-DRX configuration parameters based at least in part on a set of values, of the two or more sets of values, that includes the selected value for the first C-DRX configuration parameter.

In some aspects, the set of selected values is a set of default values for the C-DRX configuration parameters.

In some aspects, the set of default values is associated with at least one of a public land mobile network, a tracking area code, a cell identifier, or a location of the UE.

In some aspects, the one or more processors, when determining the set of selected values for the C-DRX configuration parameters, are to: determine a first set of values based at least in part on the sets of values; determine that the first set of values is not supported by a network associated with the UE; and determine the set of selected values to be a set of default values based at least in part on the determination that the first set of values is not supported by the network.

In some aspects, a UE for wireless communication includes a memory and one or more processors coupled to the memory, the one or more processors configured to: detect a trigger to update values for C-DRX configuration parameters; determine a set of selected values for the C-DRX configuration parameters based at least in part on the detection of the trigger; and transmit a request indicating the set of selected values for the C-DRX configuration parameters.

In some aspects, the trigger is a determination that no active applications are operating on the UE.

In some aspects, the determination of the set of selected values comprises determining a set of default values for the C-DRX configuration parameters based at least in part on the determination that no active applications are operating on the UE.

In some aspects, the set of default values is associated with at least one of a public land mobile network, a tracking area code, a cell identifier, or a location of the UE.

In some aspects, the trigger is a determination that an application operating on the UE has become an active application operating on the UE.

In some aspects, the determination of the set of selected values comprises recomputing a set of values for the C-DRX configuration parameters based at least in part on the determination that the application has become an active application.

In some aspects, the trigger is a determination that a state of an active application operating on the UE has changed from a first state to a second state.

In some aspects, the determination of the set of selected values comprises recomputing a set of values for the C-DRX configuration parameters based at least in part on the determination that the state of the active application has changed from the first state to the second state.

In some aspects, a UE for wireless communication includes a memory and one or more processors coupled to the memory, the one or more processors configured to: identify sets of values for C-DRX configuration parameters, each of the sets of values for the C-DRX configuration parameters being associated with a corresponding one of a plurality of active applications operating on the UE; determine a set of selected values for the C-DRX configuration parameters based at least in part on the sets of values for the C-DRX configuration parameters; and provide the set of selected values for transmission in a request indicating the set of selected values.

In some aspects, the one or more processors are configured to: identify an application operating on the UE as an active application, the application being one of the plurality of active applications, wherein the identification of the application as an active application, are to: determine a characteristic of the application; and identify the application as an active application based at least in part on the characteristic of the application.

In some aspects, the one or more processors are configured to: determine that the characteristic associated with the application satisfies a threshold associated with the characteristic; and identify the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the one or more processors, when determining the set of selected values for the C-DRX configuration parameters, are to: identify a maximum value for a first C-DRX configuration parameter among the sets of values; and determine a selected value for the first C-DRX configuration parameter as the maximum value for the first C-DRX configuration parameter.

In some aspects, the first C-DRX configuration parameter is an inactivity timer.

In some aspects, the one or more processors, when determining the set of selected values for the C-DRX configuration parameters, are to: identify a minimum value for a first C-DRX configuration parameter among the sets of values; and determine a selected value for the first C-DRX configuration parameter as the minimum value for the first C-DRX configuration parameter.

In some aspects, the first C-DRX configuration parameter is a duration of a long DRX cycle.

In some aspects, the one or more processors, when determining the set of selected values for the C-DRX configuration parameters, are to: determine a selected value for a first C-DRX configuration parameter based at least in part on the sets of values; and determine a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the one or more processors, when determining the set of selected values for the C-DRX configuration parameters, are to: identify one or more active applications of the plurality of active applications that have a highest priority value; and determine the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the determination of the set of selected values based at least in part on the two or more sets of values comprises: determine a selected value for a first C-DRX configuration parameter as a maximum value for the first C-DRX configuration parameter among the two or more sets of values.

In some aspects, the one or more processors, when determining the set of selected values based at least in part on the two or more sets of values, are to: determine a selected value for a first C-DRX configuration parameter as a minimum value for the first C-DRX configuration parameter among the two or more sets of values.

In some aspects, the set of selected values is a set of default values for the C-DRX configuration parameters.

In some aspects, the set of default values is associated with at least one of a public land mobile network, a tracking area code, a cell identifier, or a location of the UE.

In some aspects, the one or more processors, when determining the set of selected values for the C-DRX configuration parameters, are to: determine a first set of values based at least in part on the sets of values; determine that the first set of values is not supported by a network associated with the UE; and determine the set of selected values to be a set of default values based at least in part on the determination that the first set of values is not supported by the network.

In some aspects, the one or more processors, when determining the set of selected values based at least in part on the two or more sets of values, are to: determine a selected value for a first C-DRX configuration parameter based at least in part on the two or more sets of values; and determine a selected value for one or more other C-DRX configuration parameters based at least in part on a set of values, of the two or more sets of values, that includes the selected value for the first C-DRX configuration parameter.

In some aspects, a UE for wireless communication includes a memory and one or more processors coupled to the memory, the one or more processors configured to: detect a trigger to update values for C-DRX configuration parameters; determine a set of selected values for the C-DRX configuration parameters based at least in part on the detection of the trigger; and provide the set of selected values for transmission in a request indicating the set of selected values.

In some aspects, the trigger is a determination that no active applications are operating on the UE.

In some aspects, the determination of the set of selected values comprises determining a set of default values for the C-DRX configuration parameters based at least in part on the determination that no active applications are operating on the UE.

In some aspects, the set of default values is associated with at least one of a public land mobile network, a tracking area code, a cell identifier, or a location of the UE.

In some aspects, the trigger is a determination that an application operating on the UE has become an active application operating on the UE.

In some aspects, the determination of the set of selected values comprises recomputing a set of values for the C-DRX configuration parameters based at least in part on the determination that the application has become an active application.

In some aspects, the trigger is a determination that a state of an active application operating on the UE has changed from a first state to a second state.

In some aspects, the determination of the set of selected values comprises recomputing a set of values for the C-DRX configuration parameters based at least in part on the determination that the state of the active application has changed from the first state to the second state.

In some aspects, a non-transitory computer-readable medium storing one or more instructions for wireless communication includes one or more instructions that, when executed by one or more processors of a UE, cause the one or more processors to: receive, at a modem from an application processor, sets of values for C-DRX configuration parameters, each of the sets of values for the C-DRX configuration parameters being associated with a corresponding one of a plurality of active applications operating on the UE; determine a set of selected values for the C-DRX configuration parameters based at least in part on the sets of values for the C-DRX configuration parameters, wherein the one or more instructions, when causing the one or more processors to determine the set of selected values, cause the one or more processors to: identifying an extremum value for a first C-DRX configuration parameter among the sets of values, and determining a selected value for the first C-DRX configuration parameter as the extremum value for the first C-DRX configuration parameter; and transmit a request indicating the set of selected values for the C-DRX configuration parameters.

In some aspects, the one or more instructions further cause the one or more processors to: identify an application operating on the UE as an active application, the application being one of the plurality of active applications, wherein the identification of the application as an active application comprises: determine a characteristic of the application; and identify the application as an active application based at least in part on the characteristic of the application.

In some aspects, the one or more instructions, that cause the one or more processors to identify the application as an active application based at least in part on the characteristic, cause the one or more processors to: determine that the characteristic associated with the application satisfies a threshold associated with the characteristic; and identify the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the extremum value for the first C-DRX configuration parameter among the sets of values is a maximum value for the first C-DRX configuration parameter among the sets of values.

In some aspects, the first C-DRX configuration parameter is an inactivity timer.

In some aspects, the extremum value for the first C-DRX configuration parameter among the sets of values is a minimum value for the first C-DRX configuration parameter among the sets of values.

In some aspects, the first C-DRX configuration parameter is a duration of a long DRX cycle.

In some aspects, the one or more instructions, that cause the one or more processors to determine the set of selected values for the C-DRX configuration parameters, cause the one or more processors to: determine a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the one or more instructions, that cause the one or more processors to determine the set of selected values for the C-DRX configuration parameters, cause the one or more processors to: identify one or more active applications of the plurality of active applications that have a highest priority value; and determine the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the one or more instructions, that cause the one or more processors to determine the set of selected values based at least in part on the two or more sets of values, cause the one or more processors to: determine a selected value for a first C-DRX configuration parameter as a maximum value for the first C-DRX configuration parameter among the two or more sets of values.

In some aspects, the one or more instructions, that cause the one or more processors to determine the set of selected values based at least in part on the two or more sets of values, cause the one or more processors to: determine a selected value for a first C-DRX configuration parameter as a minimum value for the first C-DRX configuration parameter among the two or more sets of values.

In some aspects, the one or more instructions, that cause the one or more processors to determine the set of selected values based at least in part on the two or more sets of values, cause the one or more processors to: determine a selected value for a first C-DRX configuration parameter based at least in part on the two or more sets of values; and determine a selected value for one or more other C-DRX configuration parameters based at least in part on a set of values, of the two or more sets of values, that includes the selected value for the first C-DRX configuration parameter.

In some aspects, the set of selected values is a set of default values for the C-DRX configuration parameters.

In some aspects, the set of default values is associated with at least one of a public land mobile network, a tracking area code, a cell identifier, or a location of the UE.

In some aspects, the one or more instructions, that cause the one or more processors to the set of selected values for the C-DRX configuration parameters, cause the one or more processors to: determine a first set of values based at least in part on the sets of values; determine that the first set of values is not supported by a network associated with the UE; and determine the set of selected values to be a set of default values based at least in part on the determination that the first set of values is not supported by the network.

In some aspects, a non-transitory computer-readable medium storing one or more instructions for wireless communication includes one or more instructions that, when executed by one or more processors of a UE, cause the one or more processors to: detect a trigger to update values for C-DRX configuration parameters; determine a set of selected values for the C-DRX configuration parameters based at least in part on the detection of the trigger; and transmit a request indicating the set of selected values for the C-DRX configuration parameters.

In some aspects, the trigger is a determination that no active applications are operating on the UE.

In some aspects, the determination of the set of selected values comprises determining a set of default values for the C-DRX configuration parameters based at least in part on the determination that no active applications are operating on the UE.

In some aspects, the set of default values is associated with at least one of a public land mobile network, a tracking area code, a cell identifier, or a location of the UE.

In some aspects, the trigger is a determination that an application operating on the UE has become an active application operating on the UE.

In some aspects, the determination of the set of selected values comprises recomputing a set of values for the C-DRX configuration parameters based at least in part on the determination that the application has become an active application.

In some aspects, the trigger is a determination that a state of an active application operating on the UE has changed from a first state to a second state.

In some aspects, the determination of the set of selected values comprises recomputing a set of values for the C-DRX configuration parameters based at least in part on the determination that the state of the active application has changed from the first state to the second state.

In some aspects, a non-transitory computer-readable medium storing one or more instructions for wireless communication includes one or more instructions that, when executed by one or more processors of a UE, cause the one or more processors to: identify sets of values for C-DRX configuration parameters, each of the sets of values for the C-DRX configuration parameters being associated with a corresponding one of a plurality of active applications operating on the UE; determine a set of selected values for the C-DRX configuration parameters based at least in part on the sets of values for the C-DRX configuration parameters; and provide the set of selected values for transmission in a request indicating the set of selected values.

In some aspects, the one or more instructions further cause the one or more processors to: identify an application operating on the UE as an active application, the application being one of the plurality of active applications, wherein the identification of the application as an active application comprises: determine a characteristic of the application; and identify the application as an active application based at least in part on the characteristic of the application.

In some aspects, the one or more instructions, that cause the one or more processors to identify the application as an active application based at least in part on the characteristic, cause the one or more processors to: determine that the characteristic associated with the application satisfies a threshold associated with the characteristic; and identify the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the one or more instructions, that cause the one or more processors to determine the set of selected values for the C-DRX configuration parameters, cause the one or more processors to: identify a maximum value for a first C-DRX configuration parameter among the sets of values; and determine a selected value for the first C-DRX configuration parameter as the maximum value for the first C-DRX configuration parameter.

In some aspects, the first C-DRX configuration parameter is an inactivity timer.

In some aspects, the one or more instructions, that cause the one or more processors to determine the set of selected values for the C-DRX configuration parameters, cause the one or more processors to: identify a minimum value for a first C-DRX configuration parameter among the sets of values; and determine a selected value for the first C-DRX configuration parameter as the minimum value for the first C-DRX configuration parameter.

In some aspects, the first C-DRX configuration parameter is a duration of a long DRX cycle.

In some aspects, the one or more instructions, that cause the one or more processors to determine the set of selected values for the C-DRX configuration parameters, cause the one or more processors to: determine a selected value for a first C-DRX configuration parameter based at least in part on the sets of values; and determine a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the one or more instructions, that cause the one or more processors to determine the set of selected values for the C-DRX configuration parameters, cause the one or more processors to: identify one or more active applications of the plurality of active applications that have a highest priority value; and determine the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the one or more instructions, that cause the one or more processors to determine the set of selected values based at least in part on the two or more sets of values, cause the one or more processors to determine a selected value for a first C-DRX configuration parameter as a maximum value for the first C-DRX configuration parameter among the two or more sets of values.

In some aspects, the one or more instructions, that cause the one or more processors to determine the set of selected values based at least in part on the two or more sets of values, cause the one or more processors to determine a selected value for a first C-DRX configuration parameter as a minimum value for the first C-DRX configuration parameter among the two or more sets of values.

In some aspects, the one or more instructions, that cause the one or more processors to determine the set of selected values based at least in part on the two or more sets of values, cause the one or more processors to: determine a selected value for a first C-DRX configuration parameter based at least in part on the two or more sets of values; and determine a selected value for one or more other C-DRX configuration parameters based at least in part on a set of values, of the two or more sets of values, that includes the selected value for the first C-DRX configuration parameter.

In some aspects, the set of selected values is a set of default values for the C-DRX configuration parameters.

In some aspects, the set of default values is associated with at least one of a public land mobile network, a tracking area code, a cell identifier, or a location of the UE.

In some aspects, the one or more instructions, that cause the one or more processors to determine the set of selected values for the C-DRX configuration parameters, cause the one or more processors to: determine a first set of values based at least in part on the sets of values; determine that the first set of values is not supported by a network associated with the UE; and determine the set of selected values to be a set of default values based at least in part on the determination that the first set of values is not supported by the network.

In some aspects, a non-transitory computer-readable medium storing one or more instructions for wireless communication includes one or more instructions that, when executed by one or more processors of a UE, cause the one or more processors to: detect a trigger to update values for C-DRX configuration parameters; determine a set of selected values for the C-DRX configuration parameters based at least in part on the detection of the trigger; and provide the set of selected values for transmission in a request indicating the set of selected values.

In some aspects, the trigger is a determination that no active applications are operating on the UE.

In some aspects, the determination of the set of selected values comprises determining a set of default values for the C-DRX configuration parameters based at least in part on the determination that no active applications are operating on the UE.

In some aspects, the set of default values is associated with at least one of a public land mobile network, a tracking area code, a cell identifier, or a location of the UE.

In some aspects, the trigger is a determination that an application operating on the UE has become an active application operating on the UE.

In some aspects, the determination of the set of selected values comprises recomputing a set of values for the C-DRX configuration parameters based at least in part on the determination that the application has become an active application.

In some aspects, the trigger is a determination that a state of an active application operating on the UE has changed from a first state to a second state.

In some aspects, the determination of the set of selected values comprises recomputing a set of values for the C-DRX configuration parameters based at least in part on the determination that the state of the active application has changed from the first state to the second state.

In some aspects, an apparatus for wireless communication includes: means for receiving, at a modem from an application processor, sets of values for C-DRX configuration parameters, each of the sets of values for the C-DRX configuration parameters being associated with a corresponding one of a plurality of active applications operating on the apparatus; means for determining a set of selected values for the C-DRX configuration parameters based at least in part on the sets of values for the C-DRX configuration parameters, wherein the means for determining the set of selected values comprises: means for identifying an extremum value for a first C-DRX configuration parameter among the sets of values, and means for determining a selected value for the first C-DRX configuration parameter as the extremum value for the first C-DRX configuration parameter; and means for transmitting a request indicating the set of selected values for the C-DRX configuration parameters.

In some aspects, the apparatus includes means for identifying an application operating on the apparatus as an active application, the application being one of the plurality of active applications, wherein the means for identifying the application as an active application comprises: means for determining a characteristic of the application; and means for identifying the application as an active application based at least in part on the characteristic of the application.

In some aspects, the means for identifying the application as an active application based at least in part on the characteristic comprises: means for determining that the characteristic associated with the application satisfies a threshold associated with the characteristic; and means for identifying the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the extremum value for the first C-DRX configuration parameter among the sets of values is a maximum value for the first C-DRX configuration parameter among the sets of values.

In some aspects, the extremum value for the first C-DRX configuration parameter among the sets of values is a minimum value for the first C-DRX configuration parameter among the sets of values.

In some aspects, the first C-DRX configuration parameter is a duration of a long DRX cycle.

In some aspects, the means for determining the set of selected values for the C-DRX configuration parameters comprises: means for determining a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the means for determining the set of selected values for the C-DRX configuration parameters comprises: means for identifying one or more active applications of the plurality of active applications that have a highest priority value; and means for determining the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the means for determining the set of selected values based at least in part on the two or more sets of values comprises means for determining a selected value for a first C-DRX configuration parameter as a maximum value for the first C-DRX configuration parameter among the two or more sets of values.

In some aspects, the means for determining the set of selected values based at least in part on the two or more sets of values comprises means for determining a selected value for a first C-DRX configuration parameter as a minimum value for the first C-DRX configuration parameter among the two or more sets of values.

In some aspects, the means for determining the set of selected values based at least in part on the two or more sets of values comprises: means for determining a selected value for a first C-DRX configuration parameter based at least in part on the two or more sets of values; and means for determining a selected value for one or more other C-DRX configuration parameters based at least in part on a set of values, of the two or more sets of values, that includes the selected value for the first C-DRX configuration parameter.

In some aspects, the set of selected values is a set of default values for the C-DRX configuration parameters.

In some aspects, the set of default values is associated with at least one of a public land mobile network, a tracking area code, a cell identifier, or a location of the apparatus.

In some aspects, the means for determining the set of selected values for the C-DRX configuration parameters comprises: means for determining a first set of values based at least in part on the sets of values; means for determining that the first set of values is not supported by a network associated with the apparatus; and means for determining the set of selected values to be a set of default values based at least in part on the determination that the first set of values is not supported by the network.

In some aspects, an apparatus for wireless communication includes: means for detecting a trigger to update values for C-DRX configuration parameters; means for determining a set of selected values for the C-DRX configuration parameters based at least in part on the detection of the trigger; and means for transmitting a request indicating the set of selected values for the C-DRX configuration parameters.

In some aspects, the trigger is a determination that no active applications are operating on the apparatus.

In some aspects, the determination of the set of selected values comprises determining a set of default values for the C-DRX configuration parameters based at least in part on the determination that no active applications are operating on the apparatus.

In some aspects, the set of default values is associated with at least one of a public land mobile network, a tracking area code, a cell identifier, or a location of the apparatus.

In some aspects, the trigger is a determination that an application operating on the apparatus has become an active application operating on the apparatus.

In some aspects, the determination of the set of selected values comprises recomputing a set of values for the C-DRX configuration parameters based at least in part on the determination that the application has become an active application.

In some aspects, the trigger is a determination that a state of an active application operating on the apparatus has changed from a first state to a second state.

In some aspects, the determination of the set of selected values comprises recomputing a set of values for the C-DRX configuration parameters based at least in part on the determination that the state of the active application has changed from the first state to the second state.

In some aspects, an apparatus for wireless communication includes: means for identifying sets of values for C-DRX configuration parameters, each of the sets of values for the C-DRX configuration parameters being associated with a corresponding one of a plurality of active applications operating on the apparatus; means for determining a set of selected values for the C-DRX configuration parameters based at least in part on the sets of values for the C-DRX configuration parameters; and means for providing the set of selected values for transmission in a request indicating the set of selected values.

In some aspects, the apparatus includes means for identifying an application operating on the apparatus as an active application, the application being one of the plurality of active applications, wherein the identification of the application as an active application comprises: means for determining a characteristic of the application; and means for identifying the application as an active application based at least in part on the characteristic of the application.

In some aspects, the means for identifying the application as an active application based at least in part on the characteristic comprises: means for determining that the characteristic associated with the application satisfies a threshold associated with the characteristic; and means for identifying the application as an active application based at least in part on the determination that the characteristic satisfies the threshold associated with the characteristic.

In some aspects, the characteristic includes a throughput associated with the application.

In some aspects, the characteristic includes a number of active intervals of the application.

In some aspects, the characteristic indicates a level of user interaction associated with the application.

In some aspects, the means for determining the set of selected values for the C-DRX configuration parameters comprises: means for identifying a maximum value for a first C-DRX configuration parameter among the sets of values; and means for determining a selected value for the first C-DRX configuration parameter as the maximum value for the first C-DRX configuration parameter.

In some aspects, the first C-DRX configuration parameter is an inactivity timer.

In some aspects, the means for determining the set of selected values for the C-DRX configuration parameters comprises: means for identifying a minimum value for a first C-DRX configuration parameter among the sets of values; and means for determining a selected value for the first C-DRX configuration parameter as the minimum value for the first C-DRX configuration parameter.

In some aspects, the first C-DRX configuration parameter is a duration of a long DRX cycle.

In some aspects, the means for determining the set of selected values for the C-DRX configuration parameters comprises: means for determining a selected value for a first C-DRX configuration parameter based at least in part on the sets of values; and means for determining a selected value for one or more other C-DRX configuration parameters based at least in part on a set of values that includes the selected value for the first C-DRX configuration parameter.

In some aspects, the one or more other C-DRX configuration parameters include at least one of a duration of a short DRX cycle or a short DRX cycle timer.

In some aspects, the means for determining the set of selected values for the C-DRX configuration parameters comprises: means for identifying one or more active applications of the plurality of active applications that have a highest priority value; and means for determining the set of selected values based at least in part on one or more sets of values, of the sets of values, that correspond to the one or more active applications that have the highest priority value.

In some aspects, the one or more sets of values include a single set of values, and the determination of the set of selected values is based at least in part on the single set of values.

In some aspects, the one or more sets of values include two or more sets of values, and the determination of the set of selected values is based at least in part on the two or more sets of values.

In some aspects, the means for determining the set of selected values based at least in part on the two or more sets of values comprises means for determining a selected value for a first C-DRX configuration parameter as a maximum value for the first C-DRX configuration parameter among the two or more sets of values.

In some aspects, the means for determining the set of selected values based at least in part on the two or more sets of values comprises means for determining a selected value for a first C-DRX configuration parameter as a minimum value for the first C-DRX configuration parameter among the two or more sets of values.

In some aspects, the means for determining the set of selected values based at least in part on the two or more sets of values comprises: means for determining a selected value for a first C-DRX configuration parameter based at least in part on the two or more sets of values; and means for determining a selected value for one or more other C-DRX configuration parameters based at least in part on a set of values, of the two or more sets of values, that includes the selected value for the first C-DRX configuration parameter.

In some aspects, the set of selected values is a set of default values for the C-DRX configuration parameters.

In some aspects, the set of default values is associated with at least one of a public land mobile network, a tracking area code, a cell identifier, or a location of the apparatus.

In some aspects, the means for determining the set of selected values for the C-DRX configuration parameters comprises: means for determining a first set of values based at least in part on the sets of values; means for determining that the first set of values is not supported by a network associated with the apparatus; and means for determining the set of selected values to be a set of default values based at least in part on the determination that the first set of values is not supported by the network.

In some aspects, an apparatus for wireless communication includes: means for detecting a trigger to update values for C-DRX configuration parameters; means for determining a set of selected values for the C-DRX configuration parameters based at least in part on the detection of the trigger; and means for providing the set of selected values for transmission in a request indicating the set of selected values.

In some aspects, the trigger is a determination that no active applications are operating on the apparatus.

In some aspects, the determination of the set of selected values comprises determining a set of default values for the C-DRX configuration parameters based at least in part on the determination that no active applications are operating on the apparatus.

In some aspects, the set of default values is associated with at least one of a public land mobile network, a tracking area code, a cell identifier, or a location of the apparatus.

In some aspects, the trigger is a determination that an application operating on the apparatus has become an active application operating on the apparatus.

In some aspects, the determination of the set of selected values comprises recomputing a set of values for the C-DRX configuration parameters based at least in part on the determination that the application has become an active application.

In some aspects, the trigger is a determination that a state of an active application operating on the apparatus has changed from a first state to a second state.

In some aspects, the determination of the set of selected values comprises recomputing a set of values for the C-DRX configuration parameters based at least in part on the determination that the state of the active application has changed from the first state to the second state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A, 3B, and 4 are diagrams illustrating examples associated with UE determination of values for connected mode discontinuous reception (C-DRX) configuration parameters, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
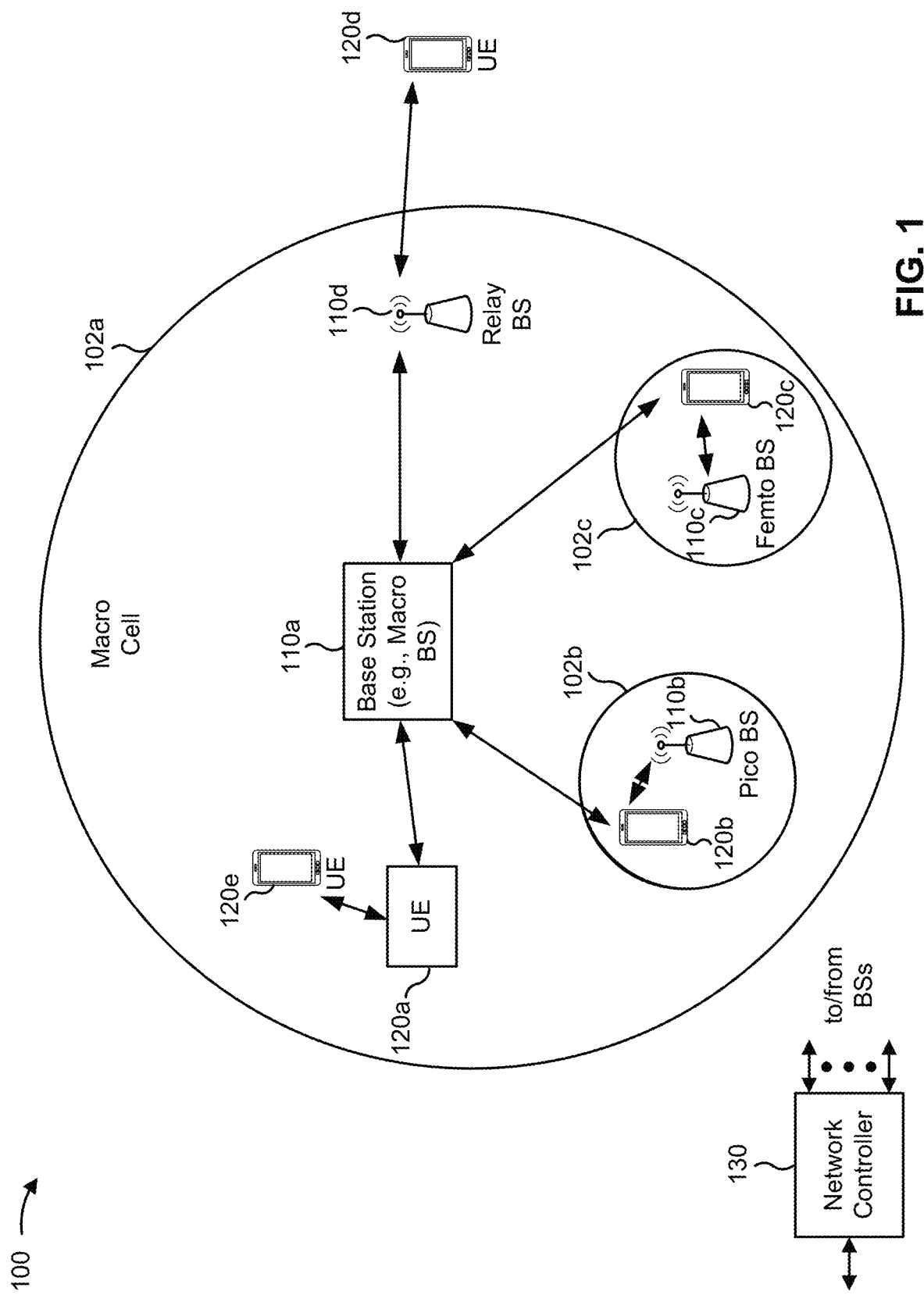
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
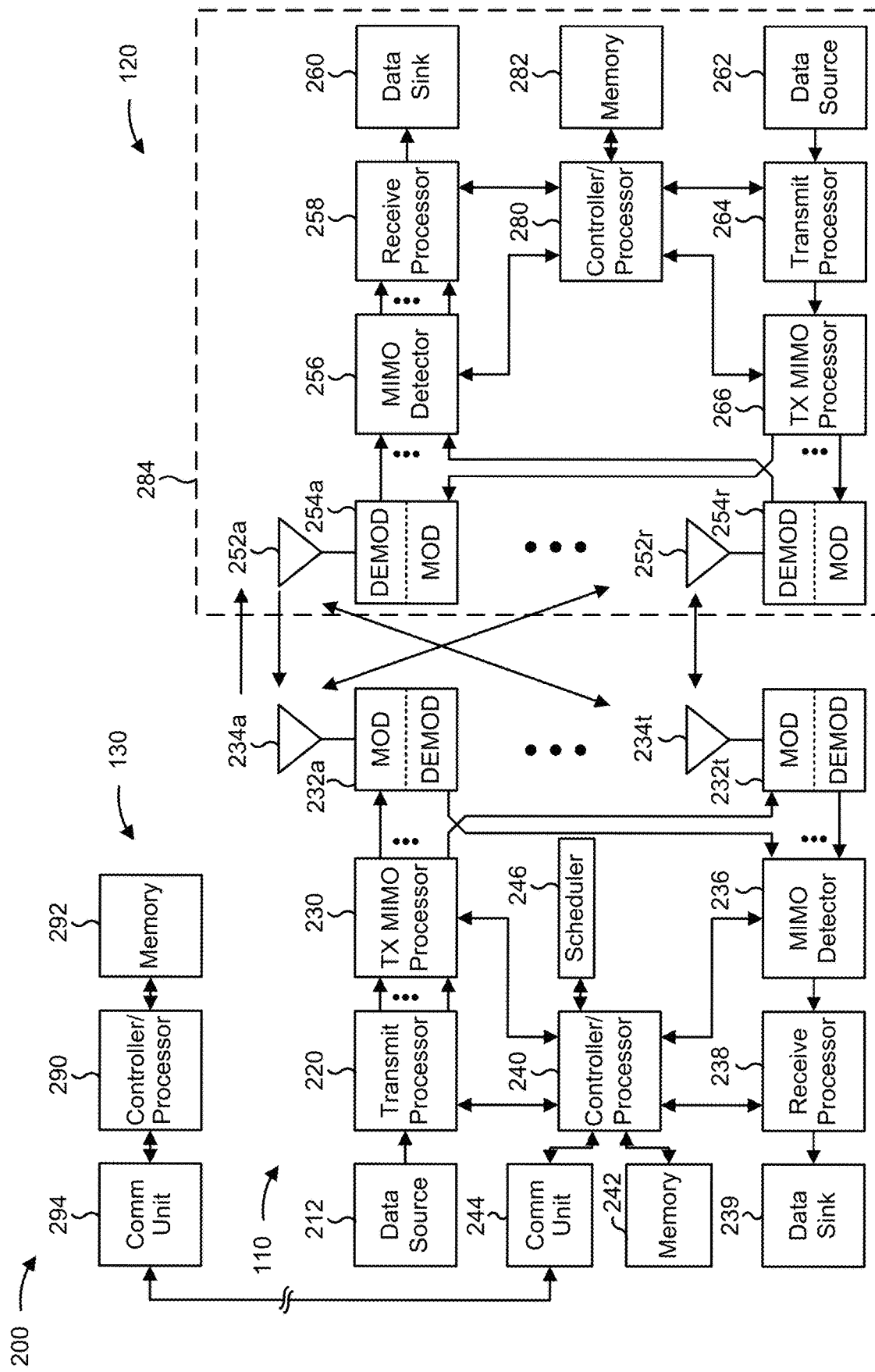
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A-8).

The controller/processor 240 of the base station 110, the controller/processor 280 of the UE 120, and/or any other component(s) of FIG. 2 may perform one or more techniques associated with UE determination of connected mode discontinuous reception (C-DRX) configuration when multiple applications are operating on the UE, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, UE 120 may include means for receiving, at a modem from an application processor, sets of values for C-DRX configuration parameters, each of the sets of values for the C-DRX configuration parameters being associated with a corresponding one of a plurality of active applications operating on the UE; means for determining a set of selected values for the C-DRX configuration parameters based at least in part on the sets of values for the C-DRX configuration parameters, wherein the means for determining the set of selected values comprises: means for identifying an extremum value for a first C-DRX configuration parameter among the sets of values, and means for determining a selected value for the first C-DRX configuration parameter as the extremum value for the first C-DRX configuration parameter; means for transmitting a request indicating the set of selected values for the C-DRX configuration parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for detecting a trigger to update values for C-DRX configuration parameters; means for determining a set of selected values for the C-DRX configuration parameters based at least in part on the detection of the trigger; means for transmitting a request indicating the set of selected values for the C-DRX configuration parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, In some aspects, UE 120 may include means for identifying sets of values for C-DRX configuration parameters, each of the sets of values for the C-DRX configuration parameters being associated with a corresponding one of a plurality of active applications operating on the UE; means for determining a set of selected values for the C-DRX configuration parameters based at least in part on the sets of values for the C-DRX configuration parameters; means for providing the set of selected values for transmission in a request indicating the C-DRX configuration parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for detecting a trigger to update values for C-DRX configuration parameters; means for determining a set of selected values for the C-DRX configuration parameters based at least in part on the detection of the trigger; means for providing the set of selected values for transmission in a request indicating the set of selected values for the C-DRX configuration parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some cases, a UE may monitor a wireless link continuously for an indication that the UE has downlink data to receive. In other cases (e.g., to conserve power and extend battery life), a UE may be configured with a discontinuous reception (DRX) cycle that includes one or more DRX states. A DRX cycle may consist of an active state (e.g., an ON Duration), during which the UE may monitor for control information (e.g., on a physical downlink control channel (PDCCH)), and a sleep or idle state, where the UE may power down some or all radio components to conserve power. In some cases, a UE may be configured with a connected mode DRX (C-DRX) state in which the UE powers down a portion of its radio components, but maintains some degree of access stratum context with the base station (e.g., at least some degree of synchronization, timing, and/or the like). Operation in the C-DRX state may conserve power consumption of the UE, thereby improving battery life.

The C-DRX state may have an associated set of C-DRX configuration parameters that define the C-DRX state. The set of C-DRX configuration parameters may include, for example, an ON duration, an inactivity timer, a short cycle duration, a long cycle duration, and a number of short cycles (also referred to as a short cycle timer). The values utilized for these C-DRX configuration parameters typically involve a risk/reward trade-off. For example, the UE may be in a sleep mode of the C-DRX state when the network wants to transmit time-sensitive traffic, which may result in an unacceptable delay (e.g., increase latency) and/or result in an outage (e.g., in case of a buffer overflow). Conversely, the UE may consume excessive amounts of battery power if the on durations of the C-DRX state are longer than is necessary.

Notably, traffic profile and delay requirements may vary significantly among different applications that can be operating on the UE at a given time. For example, a web-browsing or gaming application may require low latency, and therefore, long DRX cycles may not be suitable. Conversely, a video streaming application may tolerate larger latency due to C-DRX as data is buffered before playback. Ideally, values for C-DRX configuration parameters should be chosen based on active applications operating on the UE.

In some cases, a UE (e.g., a UE 120) may be capable of determining desired values for C-DRX configuration parameters that define a C-DRX state based at least in part on information associated with an application operating on the UE. For example, the UE may be configured with a C-DRX adaptation algorithm that receives, as inputs, information associated with the application operating on the UE and provides, as outputs, the desired values for the C-DRX configuration parameters. The C-DRX adaptation algorithm can be configured on, for example, an application processor (e.g., controller/processor 280) of the UE, a modem of the UE (e.g., MOD/DEMOD 254), and/or another component of the UE. The information associated with the application may include, for example, an application identifier, information indicating an activity mode associated with the application (e.g., web browsing, video, audio, gaming, and/or the like), information indicating an application status (e.g., whether the application is running in the foreground or the background), information associated with a traffic profile of the application (e.g., size of traffic bursts, a time between/periodicity of bursts), information associated with data activity for the application (e.g., number of bytes transmitted or received), transmission control protocol (TCP) information associated with the application (e.g., a number of active/open TCP connections), a preferred value for the C-DRX configuration parameter (e.g., a suggested or previously desired set of values for the C-DRX configuration parameters for the application), among other examples.

In some cases, the C-DRX adaptation algorithm may take into account operational information associated with the UE. That is, in some cases, the C-DRX adaptation algorithm may be designed to receive, as another input, operational information associated with the UE. The operational information (also referred to as system state information) may include various types of status information associated with the UE, such as a battery status, a charging status, a screen status, a Bluetooth/hotspot status, and/or the like.

The UE may utilize the information associated with the application and (optionally) the operational information to determine desired values for the C-DRX configuration parameters for the C-DRX state. For example, the UE (e.g., the application processor, the modem, and/or another component of the UE) may provide the inputs to a C-DRX adaptation manager (e.g., implemented in the application processor, the modem, and/or another component of the UE) configured with the C-DRX adaption algorithm. The C-DRX adaptation manager may receive the inputs and may provide, as outputs, desired values for the C-DRX configuration parameters. As indicated above, the set of desired values for the C-DRX configuration parameters may include a desired value for an ON duration, a desired value for an inactivity timer (e.g., an inactivity timer duration value), a desired value for a short cycle duration, a desired value for a long cycle duration, a desired value for a number of short cycles, and/or the like. These outputs can be provided to, for example, the application processor, the modem, or another component of the UE. The UE may then transmit (e.g., via radio resource control (RRC) signaling, a medium access control (MAC) control element, Internet Protocol (IP)-based signaling, and/or the like) a request to the base station indicating the desired set of values for the C-DRX configuration parameters.

The base station may receive the request from the UE and, in response, convey a signal indicating configured values for the set of desired values for the C-DRX configuration parameters for the UE. For example, the base station may receive the set of desired values from the UE and determine whether each of the desired values can be configured or adopted for the C-DRX state of the UE. The base station may consider the desired values in addition to other information (e.g., network status, network congestion levels, and/or the like) and, if possible, select the desired values as the configured values for the set of C-DRX configuration parameters. However, in some examples the base station may utilize a portion, but perhaps not all, of the set of desired values as the configured values (e.g., when the base station has other information that makes adopting all of the entire set of desired values impractical). The UE may receive the signal indicating the configured values for the set of C-DRX configuration parameters, and the UE may then operate in the C-DRX state according to the configured parameters from base station.

Notably, the above described C-DRX adaptation algorithm may be utilized for determination of a set of desired values for the C-DRX configuration parameters based on information associated with a single active application. However, in practice, there may be two or more active applications operating on a UE at a given time. Therefore, a manner in which to determine a set of desired values for C-DRX configuration parameters of the UE when multiple active applications are operating on the UE must be determined.

Some aspects described herein provide techniques and apparatuses for UE determination of a set of values for the C-DRX configuration parameters when multiple active applications are operating on the UE. In some aspects, the UE may identify sets of values for C-DRX configuration parameters. Here, each of the sets of values for the C-DRX configuration parameters may be associated with a corresponding one of multiple active applications operating on the UE. The UE may then determine a set of selected values for the C-DRX configuration parameters based at least in part on the sets of values for the C-DRX configuration parameters. The UE may then provide the set of selected values.

Further, some aspects described herein provide techniques and apparatus for UE update of a set of values for the C-DRX configuration parameters. In some aspects, the UE may detect a trigger to update values for C-DRX configuration parameters, and the UE may determine a set of selected values for the C-DRX configuration parameters based at least in part on the detection of the trigger. The UE may then provide the set of selected values for the C-DRX configuration parameters. Additional details are provided below.

Figure 3A:
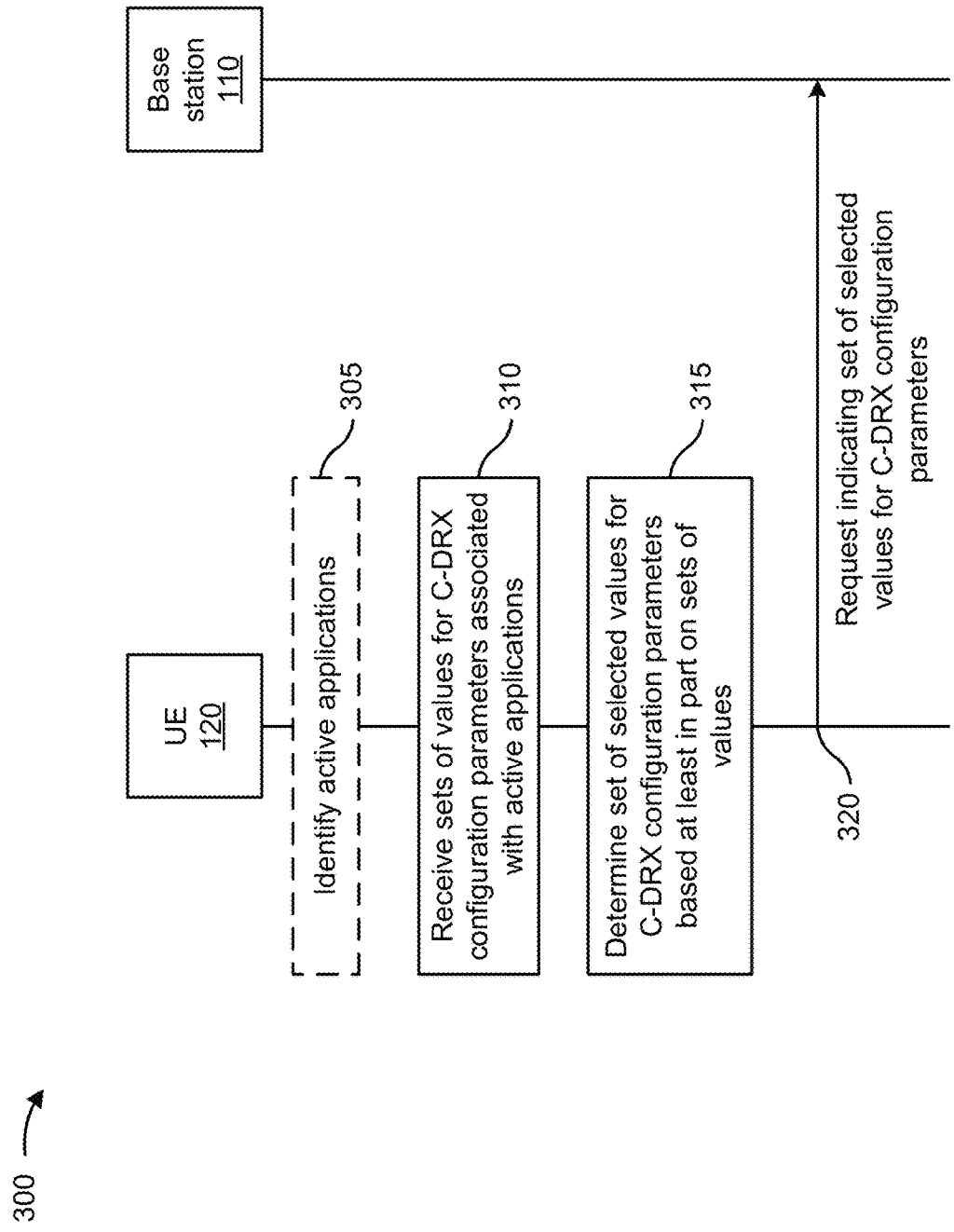

FIGS. 3A and 3B are diagrams illustrating an example 300 associated with UE determination of values for C-DRX configuration parameters when multiple active applications are operating on the UE, in accordance with the present disclosure. As shown in FIG. 3A, example 300 includes communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

As shown by reference 305, the UE may identify a plurality of active applications operating on the UE. In some aspects, the UE may identify an application as an active application based at least in part on one or more characteristics of the application. For example, the UE may determine one or more characteristics of an application, and may identify the application as an active application based at least in part on the one or more characteristics.

The one or more characteristics may include, for example, one or more metrics associated with the application, such as a throughput associated with the application (e.g., an average throughput over a particular time interval), a number of active intervals of the application (e.g., a number of time intervals, within a given period of time, during which data associated with the application was transmitted or received by the UE), and/or one or more other types of metrics. In such an aspect, the UE may identify the application as an active application based at least in part on determining that one or more characteristics satisfy corresponding thresholds associated with the one or more characteristics. For example, the UE may determine a throughput associated with an application and a number of active intervals of the application. Here, if the throughput satisfies (e.g., is greater than or equal to) a throughput threshold and the number of active intervals satisfies an activity frequency threshold, then the UE may identify the application as an active application. Conversely, if either the throughput does not satisfy (e.g., is less than) the throughput threshold or the number of active intervals does not satisfy the activity frequency threshold, then the UE may not identify the application as an active application.

As another example, the characteristic may include a level of user interaction associated with the application, such as whether a user interface of the application is being provided for display to a user (e.g., on a display screen of the UE, on an external screen via screen mirroring/docking, and/or the like), whether audio associated with the application is being provided for listening to by the user (e.g., whether the application is playing audio using speakers on the UE, through a speaker connected to the UE via a wired or wireless connection, and/or the like), or another type of mechanism indicative of interaction with the user.

In such an aspect, the UE may identify the application as an active application based at least in part on the characteristic indicative of the level of user interaction. For example, if the characteristic indicates that the application is being provided for display or for listening to by the user, then the UE may identify the application as an active application. Conversely, if the characteristic indicates that the application is not being provided for display or for listening to by the user, then the UE may not identify the application as an active application.

In some aspects, the UE may determine whether a given application is an active application on a periodic basis (e.g., such that the UE may reevaluate whether the given application is active over time). In some aspects, the UE may determine whether the given application is active based at least in part on an indication (e.g., from the user, from the base station). In example 300, the UE identifies a plurality of (i.e., at least two) active applications operating on the UE.

As shown by reference 310, the UE may identify sets of values for C-DRX configuration parameters, where each of the sets of values for the C-DRX configuration parameters is associated with a corresponding one of the plurality of active applications operating on the UE.

In some aspects, the sets of values for the C-DRX configuration parameters may be provided to or determined by the UE (e.g., at an earlier time). For example, the sets of values for the C-DRX configuration parameters may be preconfigured on the UE. As a particular example, one or more sets of values for the C-DRX configuration parameters may be preconfigured on the UE by the base station. As another particular example, one or more sets of values for the C-DRX configuration parameters (e.g., a table including one or more sets of values for the C-DRX configuration parameters) may be preconfigured on the UE by a software client (e.g., on a high level operating system), which may obtain the one or more sets of values (e.g., table entries) locally (e.g., by reading from static memory) or by receiving the one or more sets of values an application server (e.g., for first-time configuration of the table, for updating a previously configured table, and/or the like). As another particular example, one or more sets of values for the C-DRX configuration parameters may be preconfigured on the UE via a software update. In some aspects, one or more sets values for the C-DRX configuration parameters may be updated in a static memory of the UE.

As another example, the sets of values for the C-DRX configuration parameters may be computed by the UE (e.g., using a C-DRX adaptation algorithm, as described above) and stored on the UE.

In some aspects, the UE may determine a value for a particular C-DRX configuration parameter in one of the sets of values based at least in part on a characteristic or requirement of an associated application. For example, the UE can determine a value of the inactivity timer for a given application based at least in part on a traffic profile of the application. As a particular example, the UE can determine the value of the inactivity timer so that the value of the inactivity timer is greater than or equal to a 50th-percentile inter-burst time of the traffic profile of the application. In this example, if the 50th-percentile inter-burst time of the traffic of the particular application is 75 milliseconds (ms), then UE may determine the value of the inactivity timer as 75 ms. Notably, if the inactivity timer value can only be selected from a set of allowed values (e.g., as dictated by a relevant 3GPP standard), then the UE may determine the value of the inactivity timer from the set of allowed values. For example, if the UE determines the value of the inactivity timer as 75 ms, and a closest value in the set of allowed values not less than the 50th-percentile inter-burst time is 80 ms, then the UE may determine the value of the inactivity timer as 80 ms. Alternatively, an application domain can provide the value of the inactivity timer to the UE, or the application domain can provide the inter-burst time value to the UE, and the UE can determine the value of the inactivity timer accordingly.

As another example, the UE can determine a value for the duration of the long DRX cycle for a given application based at least in part on a delay requirement of the given application. As a particular example, the UE can determine the value for the duration of the long DRX cycle so that the duration of the long DRX cycle is less than or equal to a 99th-percentile delay requirement of the application. In this example, if the 99th-percentile delay requirement is 165 ms, then UE may determine the value for the duration of the long DRX cycle as 165 ms. Notably, if the value for the duration of the long DRX cycle can only be selected from a set of allowed values (e.g., as dictated by a relevant 3GPP standard), then the UE may determine the value for the duration of the long DRX cycle from the set of allowed values. For example, if the UE determines the value for the duration of the long DRX cycle as 165 ms and closest value in the set of allowed values not more than the 99th-percentile delay requirement is 160 ms, then the UE may determine the value for the duration of the long DRX cycle as 160 ms. Alternatively, an application domain can provide the value for the duration of the long DRX cycle to the UE, or the application domain can provide an indication of the delay requirement to the UE, and the UE can determine the value for the duration of the long DRX cycle accordingly.

In some aspects, a given set of values includes particular values for one or more C-DRX configuration parameters (e.g., an inactivity timer, a long cycle duration, a short cycle duration, a short cycle timer, and/or the like), and associated with an application identifier that associates the sets of values with an application. FIG. 3B is a diagram of an example table including sets of values for the C-DRX configuration parameters for four different applications. As an example, as shown in FIG. 3B, a set of values for an application identified as App1 comprises a value a1 for the inactivity timer, a value b1 for the long cycle duration, a value c1 for the short cycle duration, and a value d1 for the short cycle timer. In some aspects, as shown in FIG. 3B, an application may be associated with a priority level (e.g., App1 is associated with a priority level of 1 in FIG. 3B) that can be used for determination of a set of selected values for the C-DRX configuration parameters, as described below.

Returning to FIG. 3A, as shown by reference 315, the UE may determine a set of selected values for the C-DRX configuration parameters based at least in part on the sets of values for the C-DRX configuration parameters. The set of selected values for the C-DRX configuration parameters is a set of values for the C-DRX configuration parameters that the UE is to indicate in a request provided to the base station (e.g., such that the base station can determine a set of configured values for the C-DRX configuration parameters).

In some aspects, the UE may determine a selected value for a particular C-DRX configuration parameter as a maximum value for the particular C-DRX configuration parameter from the sets of values for the C-DRX configuration parameters. For example, the UE may identify M (M>1) active applications and, therefore, may identify M sets of values for the C-DRX configuration parameters, where each of the M sets of values is associated with one of the M active applications. Here, the UE may identify a maximum value for a particular C-DRX configuration parameter among the M sets of values, and the UE may identify the selected value for the particular C-DRX configuration parameter as the maximum value. As a particular example, the UE may identify a maximum value for the inactivity timer among the M sets of values, and the UE may identify the selected value for the inactivity timer as the determined maximum value.

In some aspects, the UE may determine a selected value for a particular C-DRX configuration parameter as a minimum value for the particular C-DRX configuration parameter from the sets of values for the C-DRX configuration parameters. For example, the UE may identify M active applications and, therefore, may identify M sets of values for the C-DRX configuration parameters, where each of the M sets of values is associated with one of the M active applications. Here, the UE may identify a minimum value for a particular C-DRX configuration parameter among the M sets of values, and the UE may identify the selected value for the particular C-DRX configuration parameter as the minimum value. As a particular example, the UE may identify a minimum value for the long cycle duration among the M sets of values, and the UE may identify the selected value for the duration of the long DRX cycle as the determined minimum value.

In some aspects, the UE may determine selected values for one or more C-DRX configuration parameters based at least in part on a set of values that includes a selected value for another C-DRX configuration parameter. For example, the UE may identify an extremum (e.g., minimum or maximum) value for a particular C-DRX configuration parameter among the M sets of values, and may identify a selected value for a particular C-DRX configuration parameter as the extremum value, as described above. Here, the UE may identify selected values for one or more other C-DRX configuration parameters from the set of values that included the extremum value for the particular C-DRX configuration parameter. As a particular example, the UE may identify a minimum value for the long cycle duration among the M sets of values, and the UE may identify a selected value for the duration of the long DRX cycle as the determined minimum value. Next, the UE may identify selected values for the duration of the short DRX cycle and the short DRX cycle timer from the set of values that included the minimum value for the duration of the long DRX cycle.

In some aspects, the UE may determine the set of selected values for the C-DRX configuration parameters based at least in part on priorities associated with the active applications. For example, as indicated above with respect to FIG. 3B, the sets of values may include a priority level associated with one or more of the active applications. Here, the UE may determine the set of selected values for the C-DRX configuration parameters based at least in part on the priority levels. For example, the UE may identify one or more active applications of the plurality of active applications that have a highest priority value (e.g., priority level 1), and may determine the set of selected values based at least in part on one or more sets of values that correspond to the one or more active applications that have the highest priority value.

In some aspects, a single active application has the highest priority level. In such a case, the UE may determine the set of selected values based at least in part on the single set of values (e.g., the set of selected values for the C-DRX configuration parameters may include the set of values associated with the application that has the highest priority level).

In some aspects, a plurality of active applications has the highest priority level, and the sets of values associated with the plurality of active applications may be the same (e.g., the sets of values may be the same for each of the plurality of active applications). In such a case, the UE may determine the set of selected values based at least in part on any of the set of values associated with the plurality of active applications (e.g., the set of selected values for the C-DRX configuration parameters may include the set of values associated with all of the applications that have the highest priority level).

In some aspects, a plurality of active applications has the highest priority level, and the sets of values associated with the plurality of active applications may be different. In such a case, the UE may determine the set of selected values based at least in part on the plurality of sets of values for the C-DRX configuration parameters. For example, when a value for a first C-DRX configuration parameter (e.g., the inactivity timer) differs among the plurality of sets of values, the UE may determine a selected value for the first C-DRX configuration parameter as a maximum value for the first C-DRX configuration parameter among the plurality of sets of values. As another example, when a value for a second C-DRX configuration parameter (e.g., the duration of the long DRX cycle) differs among the plurality of sets of values, the UE may determine a selected value for the second C-DRX configuration parameter as a maximum value for the second C-DRX configuration parameter among the plurality of sets of values. Continuing this example, the UE may determine selected values for one or more other C-DRX configuration parameters (e.g., the duration of the short DRX cycle, the short DRX cycle timer, and/or the like) based at least in part on a set of values, of the plurality of sets of values, that includes the selected value for the second C-DRX configuration parameter.

In some aspects, the set of selected values determined by the UE may be a set of default values for the C-DRX configuration parameters. In some aspects, the UE stores the set of default values for the C-DRX configuration parameters per cell, which can be determined as the C-DRX configuration in a first reconfiguration associated with the cell.

In some aspects, the UE may determine the set of selected values to be the set of default values based at least in part on a determination that a first set of selected values is not supported by the network. For example, the UE may determine a first set of selected values based at least in part on the sets of values in the manner described above. Next, the UE may determine that the first set of selected values is not supported by the network. For example, in some aspects, the UE may store a list of C-DRX configurations supported by the network (e.g., a list of supported sets of values for the C-DRX configuration parameters), and may determine that the first set of selected values is supported based at least in part on the list of supported C-DRX configurations. In some aspects, the list of supported C-DRX configurations can be stored per public land mobile network (PLMN), tracking area code (TAC), cell identifier, or a location of the UE (e.g., as determined thorough a global positioning system (GPS), Wi-Fi, a basic service set (BSS) identifier, and/or the like). Here, the UE may determine the set of selected values to be the set of default values based at least in part on the determination that the first set of selected values is not supported by the network.

As shown by reference 320, the UE may transmit a request indicating the set of selected values for the C-DRX configuration parameters. For example, the UE may transmit (e.g., via RRC signaling, a MAC control element, IP-based signaling, and/or the like) a request to the base station indicating the set of selected values for the C-DRX configuration parameters. The base station may receive the request from the UE and, in response, convey a signal indicating configured values for the set of desired values for the C-DRX configuration parameters for the UE, as described above.

As indicated above, FIGS. 3A-3B are provided as an example. Other examples may differ from what is described with regard to FIGS. 3A-3B.

Figure 4:
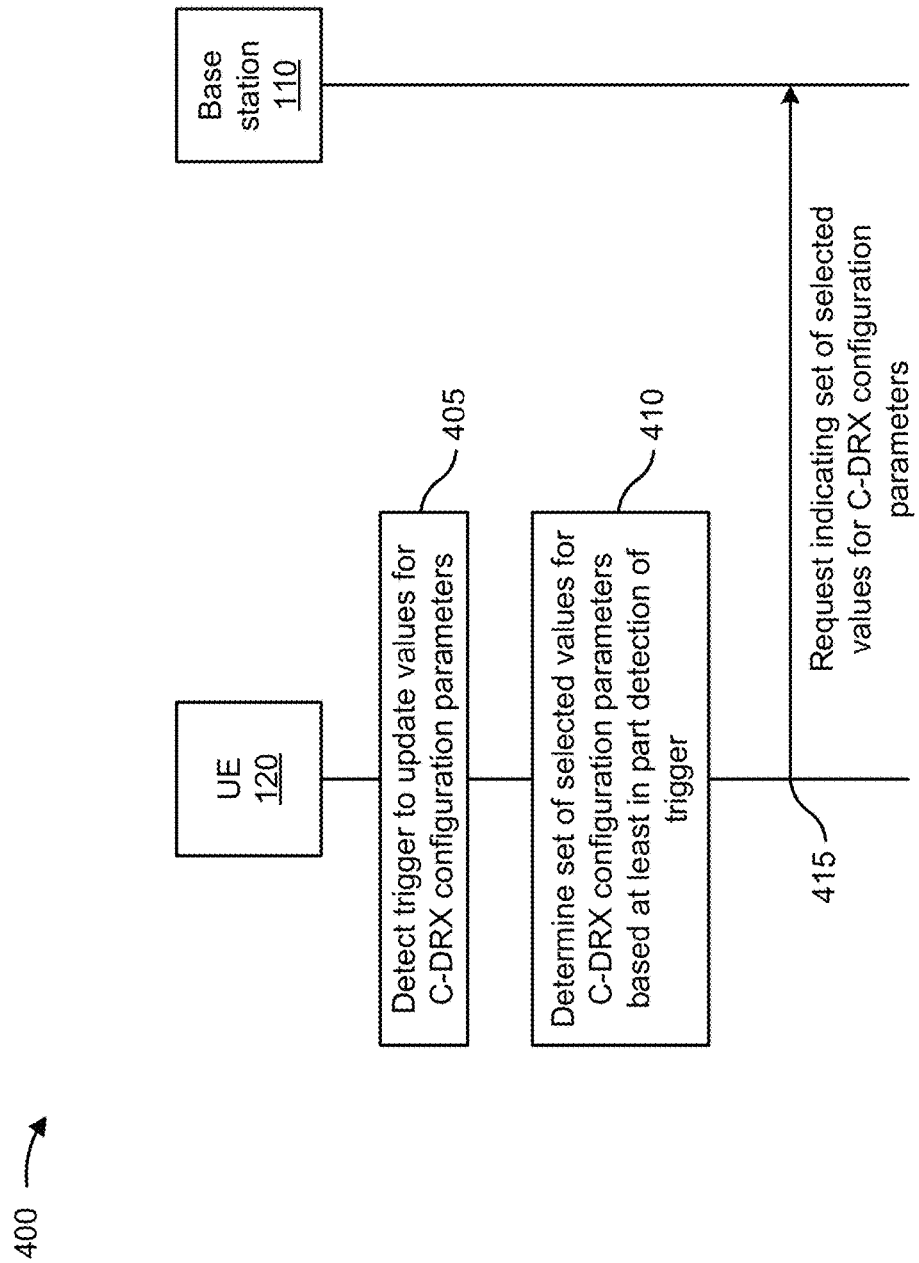

FIG. 4 is a diagram illustrating an example 400 associated with UE determination of values for C-DRX configuration parameters based on detection of a trigger to update the values for the C-DRX configuration parameters, in accordance with the present disclosure. As shown in FIG. 4, example 400 includes communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

As shown by reference 405, the UE may detect a trigger to update values for C-DRX configuration parameters. In some aspects, the trigger includes an event that causes the UE to update values for C-DRX configuration parameters for a C-DRX state of the UE.

In some aspects, the trigger is a determination that no active applications are operating on the UE. For example, the UE may perform a process associated with identifying active applications on the UE, as described above with respect to FIGS. 3A and 3B. Here, a determination by the UE that there are no active applications operating on the UE (e.g., for a particular period of time) may serve as a trigger to update the values for the C-DRX configuration parameters. In some aspects, no active application trigger may be limited to a particular set of applications (e.g., a set of predefined applications).

In some aspects, the trigger is a determination that an application operating on the UE has become an active application operating on the UE. For example, the UE may perform a process associated with identifying active applications on the UE, as described above with respect to FIG. 3. Here, a determination by the UE that an application has become newly active may serve as a trigger to update the values for the C-DRX configuration parameters.

In some aspects, the trigger is a determination that a state of an active application operating on the UE has changed from a first state to a second state. For example, the UE may determine that an active application has switched from operating in the foreground to operating in the background, and this determination may serve as a trigger to update the values for the C-DRX configuration parameters.

As shown by reference 410, the determination of a set of selected values for the C-DRX configuration parameters may be based at least in part on the detection of the trigger. In some aspects, a manner in which a UE determines a set of selected values for the C-DRX configuration parameters depends on the type of trigger detected by the UE.

In some aspects, if the trigger is a determination that no active applications are operating on the UE, then the UE may determine the set of selected values as a set of default values for the C-DRX configuration parameters.

In some aspects, if the trigger is a determination that an application has become an active application (e.g., when a newly active application is identified), then the UE may determine the set of selected values by recomputing a set of values for the C-DRX configuration parameters. For example, in some aspects, the UE may recompute the set of values by determining a set of selected values for the C-DRX configuration parameters in the manner described above in association with FIGS. 3A and 3B. Alternatively, the UE may recompute the set of values by determining a set of desired values using a C-DRX adaptation algorithm configured on the UE.

In some aspects, if the trigger is a determination that a state of an active application operating on the UE has changed from a first state to a second state, then the UE may determine the set of selected values by recomputing a set of values for the C-DRX configuration parameters. For example, in some aspects, the UE may recompute the set of values by determining a set of selected values for the C-DRX configuration parameters in the manner described above in association with FIGS. 3A and 3B. Alternatively, the UE may recompute the set of values by determining a set of desired values using a C-DRX adaptation algorithm configured on the UE.

As shown by reference 415, the UE may transmit a request indicating the set of selected values for the C-DRX configuration parameters. For example, the UE may transmit (e.g., via RRC signaling, a MAC control element, IP-based signaling, and/or the like) a request to the base station indicating the selected set of values for the C-DRX configuration parameters. The base station may receive the request from the UE and, in response, convey a signal indicating configured values for the set of desired values for the C-DRX configuration parameters for the UE, as described above.

As indicated above, FIG. 4 is provided as an example. Other examples may differ from what is described with regard to FIG. 4.

Figure 5:
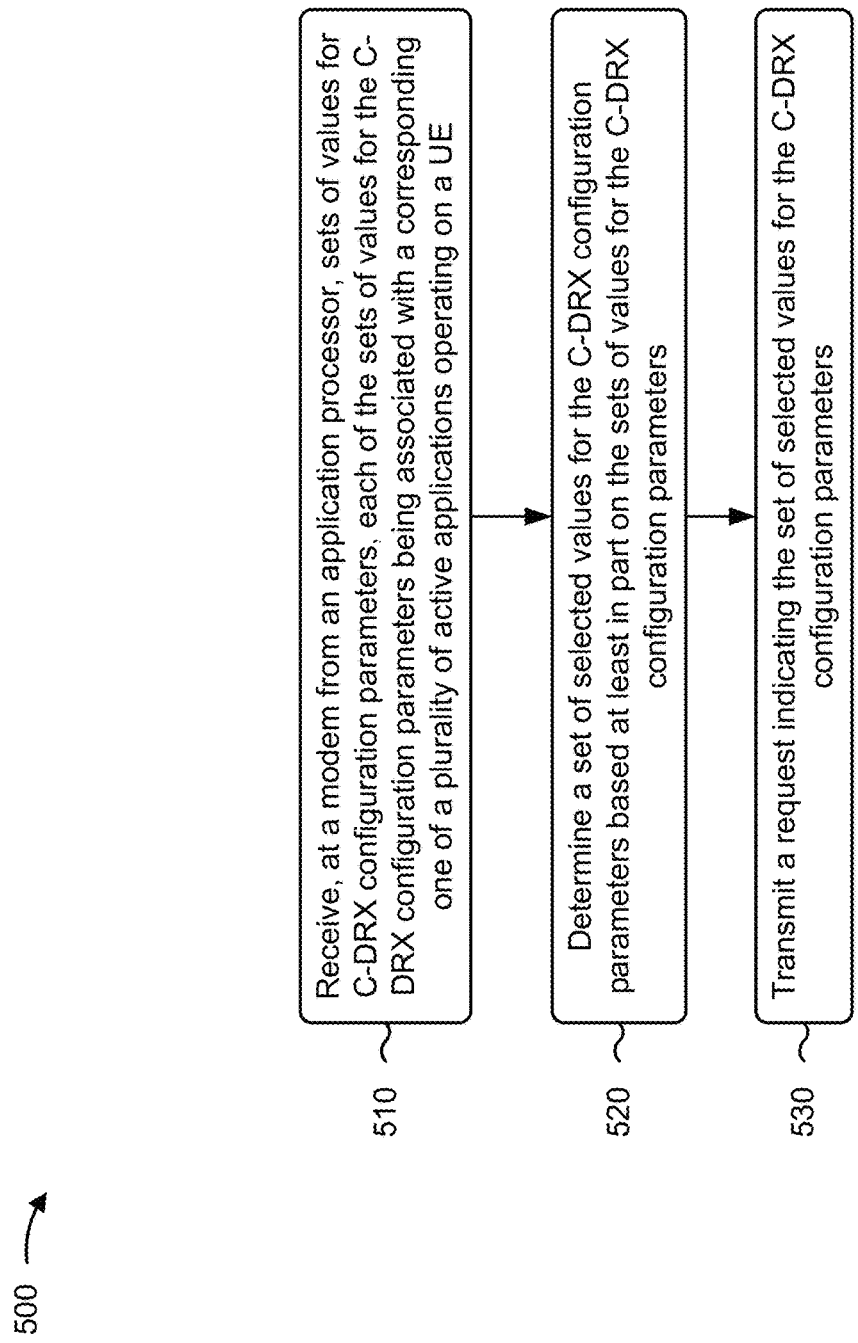
FIGS. 5-8 are diagrams illustrating example processes associated with UE determination of values for C-DRX configuration parameters, in accordance with the present disclosure.

FIG. 5 is a diagram illustrating an example process 500 performed, for example, by a UE, in accordance with the present disclosure. Example process 500 is an example where the UE (e.g., UE 120) performs operations associated with UE determination of values for C-DRX configuration parameters.

As shown in FIG. 5, in some aspects, process 500 may include receiving, at a modem and from an application processor, sets of values for C-DRX configuration parameters, each of the sets of values for the C-DRX configuration parameters being associated with a corresponding one of a plurality of active applications operating on the UE (block 510). For example, the UE (e.g., using parameter reception component 908) may receive, at a modem and from an application processor, sets of values for C-DRX configuration parameters, each of the sets of values for the C-DRX configuration parameters being associated with a corresponding one of a plurality of active applications operating on the UE, as described above.

As further shown in FIG. 5, in some aspects, process 500 may include determining a set of selected values for the C-DRX configuration parameters based at least in part on the sets of values for the C-DRX configuration parameters (block 520). For example, the UE (e.g., using determination component 910) may determine a set of selected values for the C-DRX configuration parameters based at least in part on the sets of values for the C-DRX configuration parameters, as described above. In some aspects, when determining the set of selected values, the UE may identify an extremum value for a first C-DRX configuration parameter among the sets of values, and determine a selected value for the first C-DRX configuration parameter as the extremum value for the first C-DRX configuration parameter.

As further shown in FIG. 5, in some aspects, process 500 may include transmitting a request indicating the set of selected values for the C-DRX configuration parameters (block 530). For example, the UE (e.g., using transmission component 904) may transmit a request indicating the set of selected values for the C-DRX configuration parameters, as described above.

Process 500 may include additional aspects, such as any single aspect or any combination of aspects described below and/or in connection with one or more other processes described elsewhere herein.

In a first aspect, process 500 includes identifying an application operating on the UE as an active application, the application being one of the plurality of active applications, wherein the identification of the application as an active application comprises determining a characteristic of the application, and identifying the application as an active application based at least in part on the characteristic of the application.

In a second aspect, alone or in combination with the first aspect, the identification of the application as an active application based at least in part on the characteristic comprises determining that the characteristic associated with the application satisfies a threshold associated with the characteristic, and identifying the application as an active application based at least in part on the determination that the characteristic satisfies the threshold associated with the characteristic.

In a third aspect, alone or in combination with one or more of the first and second aspects, the characteristic includes a throughput associated with the application.

In a fourth aspect, alone or in combination with one or more of the first through third aspects, the characteristic includes a number of active intervals of the application.

In a fifth aspect, alone or in combination with one or more of the first through fourth aspects, the characteristic indicates a level of user interaction associated with the application.

In a sixth aspect, alone or in combination with one or more of the first through fifth aspects, the extremum value for the first C-DRX configuration parameter among the sets of values is a maximum value for the first C-DRX configuration parameter among the sets of values.

In a seventh aspect, alone or in combination with one or more of the first through sixth aspects, the first C-DRX configuration parameter is an inactivity timer.

In an eighth aspect, alone or in combination with one or more of the first through seventh aspects, the extremum value for the first C-DRX configuration parameter among the sets of values is a minimum value for the first C-DRX configuration parameter among the sets of values.

In a ninth aspect, alone or in combination with one or more of the first through eighth aspects, the first C-DRX configuration parameter is a duration of a long DRX cycle.

In a tenth aspect, alone or in combination with one or more of the first through ninth aspects, the determination of the set of selected values for the C-DRX configuration parameters comprises determining a selected value for one or more other C-DRX configuration parameters based at least in part on a set of values that includes the selected value for the first C-DRX configuration parameter.

In an eleventh aspect, alone or in combination with one or more of the first through tenth aspects, the one or more other C-DRX configuration parameters include at least one of a duration of a short DRX cycle or a short DRX cycle timer.

In a twelfth aspect, alone or in combination with one or more of the first through eleventh aspects, the determination of the set of selected values for the C-DRX configuration parameters comprises identifying one or more active applications of the plurality of active applications that have a highest priority value, and determining the set of selected values based at least in part on one or more sets of values, of the sets of values, that correspond to the one or more active applications that have the highest priority value.

In a thirteenth aspect, alone or in combination with one or more of the first through twelfth aspects, the one or more sets of values include a single set of values, and the determination of the set of selected values is based at least in part on the single set of values.

In a fourteenth aspect, alone or in combination with one or more of the first through thirteenth aspects, the one or more sets of values include two or more sets of values, and the determination of the set of selected values is based at least in part on the two or more sets of values.

In a fifteenth aspect, alone or in combination with one or more of the first through fourteenth aspects, the determination of the set of selected values based at least in part on the two or more sets of values comprises determining a selected value for a first C-DRX configuration parameter as a maximum value for the first C-DRX configuration parameter among the two or more sets of values.

In a sixteenth aspect, alone or in combination with one or more of the first through fifteenth aspects, the determination of the set of selected values based at least in part on the two or more sets of values comprises determining a selected value for a first C-DRX configuration parameter as a minimum value for the first C-DRX configuration parameter among the two or more sets of values.

In a seventeenth aspect, alone or in combination with one or more of the first through sixteenth aspects, the determination of the set of selected values based at least in part on the two or more sets of values comprises determining a selected value for a first C-DRX configuration parameter based at least in part on the two or more sets of values, and determining a selected value for one or more other C-DRX configuration parameters based at least in part on a set of values, of the two or more sets of values, that includes the selected value for the first C-DRX configuration parameter.

In an eighteenth aspect, alone or in combination with one or more of the first through seventeenth aspects, the set of selected values is a set of default values for the C-DRX configuration parameters.

In a nineteenth aspect, alone or in combination with one or more of the first through eighteenth aspects, the set of default values is associated with at least one of a public land mobile network, a tracking area code, a cell identifier, or a location of the UE.

In a twentieth aspect, alone or in combination with one or more of the first through nineteenth aspects, the determination of the set of selected values for the C-DRX configuration parameters comprises determining a first set of values based at least in part on the sets of values, determining that the first set of values is not supported by a network associated with the UE, and determining the set of selected values to be a set of default values based at least in part on the determination that the first set of values is not supported by the network.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
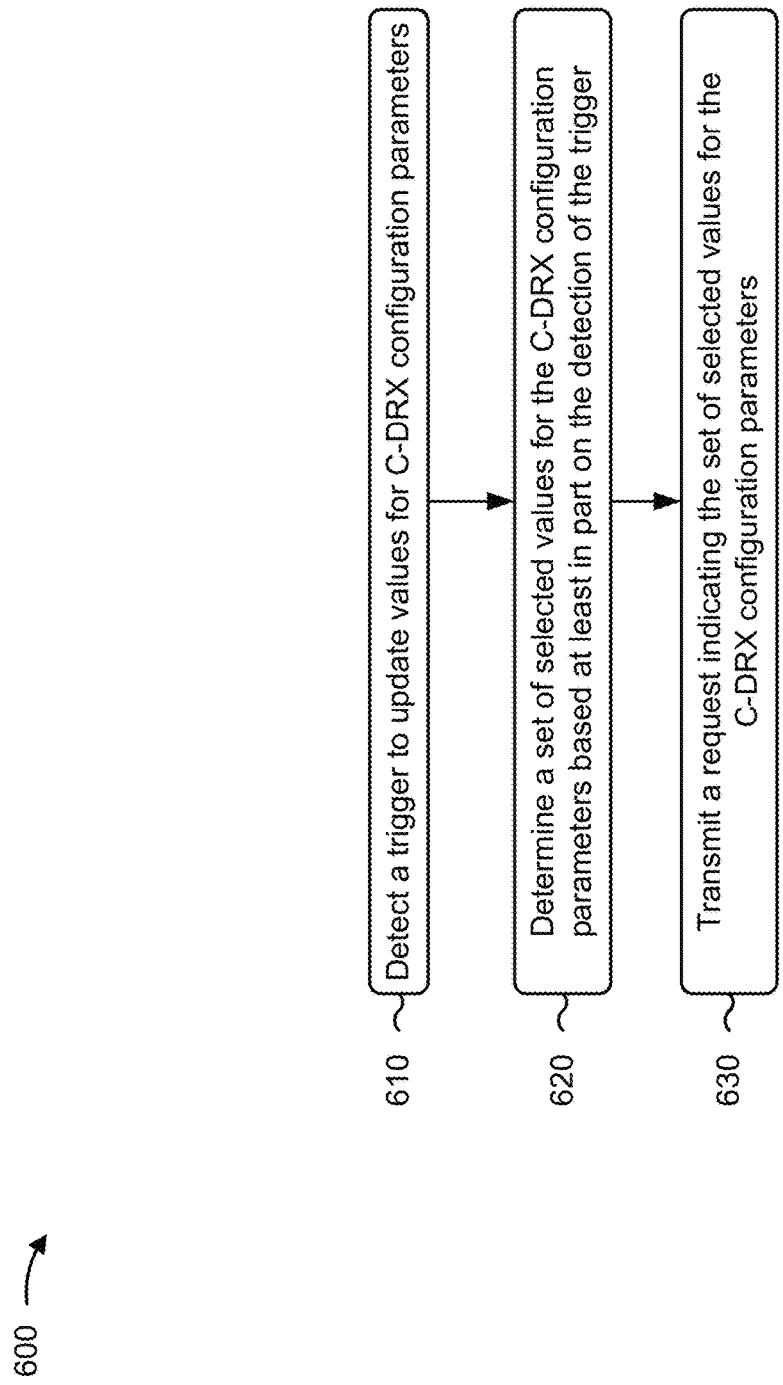

FIG. 6 is a diagram illustrating an example process 600 performed, for example, by a UE, in accordance with the present disclosure. Example process 600 is an example where the UE (e.g., UE 120) performs operations associated with UE determination of values for C-DRX configuration parameters.

As shown in FIG. 6, in some aspects, process 600 may include detecting a trigger to update values for C-DRX configuration parameters (block 610). For example, the UE (e.g., using detection component 1008) may detect a trigger to update values for C-DRX configuration parameters, as described above.

As further shown in FIG. 6, in some aspects, process 600 may include determining a set of selected values for the C-DRX configuration parameters based at least in part on the detection of the trigger (block 620). For example, the UE (e.g., using determination component 1010) may determine a set of selected values for the C-DRX configuration parameters based at least in part on the detection of the trigger, as described above.

As further shown in FIG. 6, in some aspects, process 600 may include transmitting a request indicating the set of selected values for the C-DRX configuration parameters (block 630). For example, the UE (e.g., using transmission component 1004) may transmit a request indicating the set of selected values for the C-DRX configuration parameters, as described above.

Process 600 may include additional aspects, such as any single aspect or any combination of aspects described below and/or in connection with one or more other processes described elsewhere herein.

In a first aspect, the trigger is a determination that no active applications are operating on the UE.

In a second aspect, alone or in combination with the first aspect, the determination of the set of selected values comprises determining a set of default values for the C-DRX configuration parameters based at least in part on the determination that no active applications are operating on the UE.

In a third aspect, alone or in combination with one or more of the first and second aspects, the set of default values is associated with at least one of a public land mobile network, a tracking area code, a cell identifier, or a location of the UE.

In a fourth aspect, alone or in combination with one or more of the first through third aspects, the trigger is a determination that an application operating on the UE has become an active application operating on the UE.

In a fifth aspect, alone or in combination with one or more of the first through fourth aspects, the determination of the set of selected values comprises recomputing a set of values for the C-DRX configuration parameters based at least in part on the determination that the application has become an active application.

In a sixth aspect, alone or in combination with one or more of the first through fifth aspects, the trigger is a determination that a state of an active application operating on the UE has changed from a first state to a second state.

In a seventh aspect, alone or in combination with one or more of the first through sixth aspects, the determination of the set of selected values comprises recomputing a set of values for the C-DRX configuration parameters based at least in part on the determination that the state of the active application has changed from the first state to the second state.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
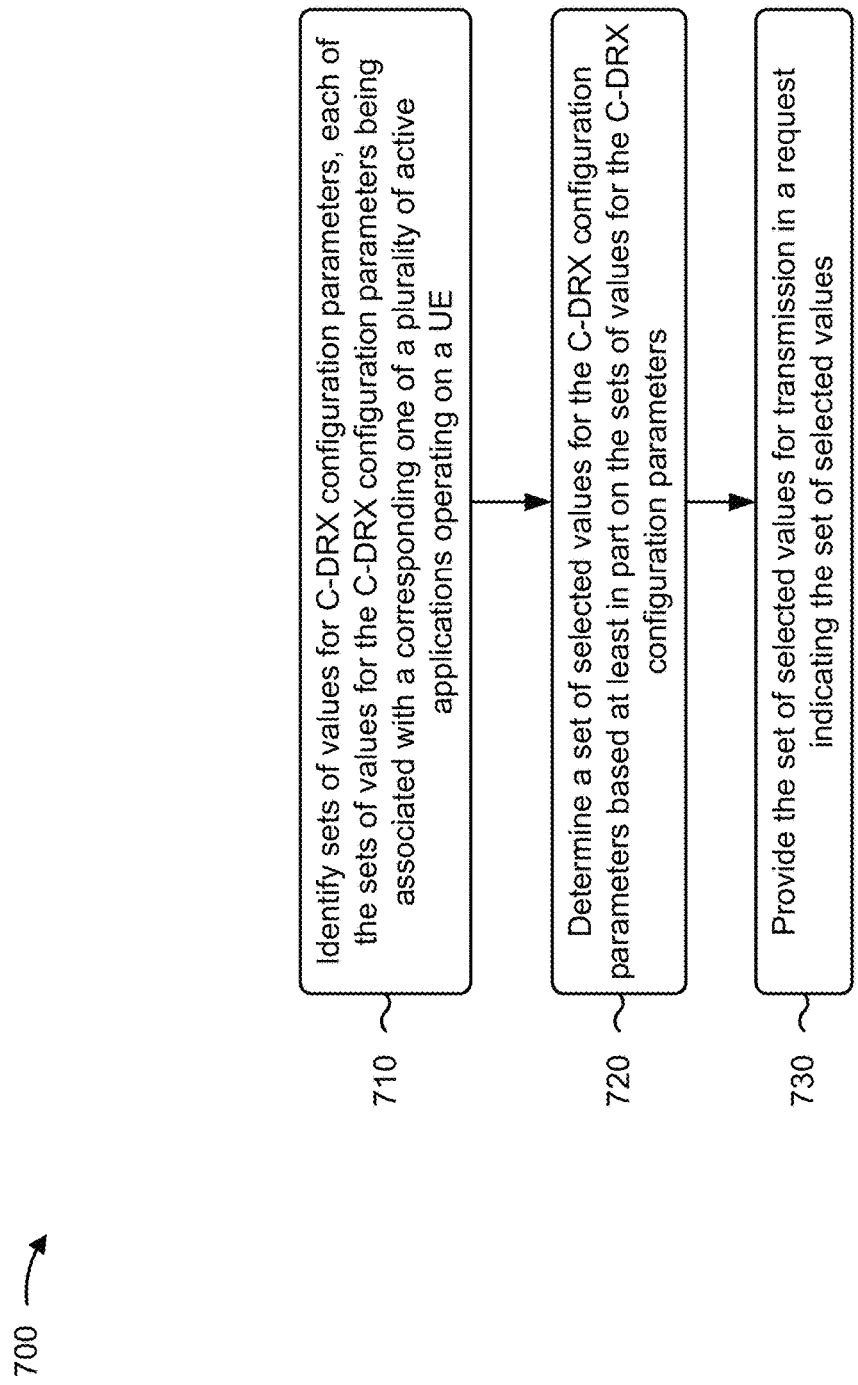

FIG. 7 is a diagram illustrating an example process 700 performed, for example, by a UE, in accordance with the present disclosure. Example process 700 is an example where the UE (e.g., UE 120) performs operations associated with UE determination of values for C-DRX configuration parameters.

As shown in FIG. 7, in some aspects, process 700 may include identifying sets of values for C-DRX configuration parameters, each of the sets of values for the C-DRX configuration parameters being associated with a corresponding one of a plurality of active applications operating on the UE (block 710). For example, the UE (e.g., using identification component 1108) may identify sets of values for connected mode discontinuous reception (C-DRX) configuration parameters, each of the sets of values for the C-DRX configuration parameters being associated with a corresponding one of a plurality of active applications operating on the UE, as described above.

As further shown in FIG. 7, in some aspects, process 700 may include determining a set of selected values for the C-DRX configuration parameters based at least in part on the sets of values for the C-DRX configuration parameters (block 720). For example, the UE (e.g., using determination component 1110) may determine a set of selected values for the C-DRX configuration parameters based at least in part on the sets of values for the C-DRX configuration parameters, as described above.

As further shown in FIG. 7, in some aspects, process 700 may include providing the set of selected values for transmission in a request indicating the set of selected values (block 730). For example, the UE (e.g., using provision component 1112) may provide the set of selected values for transmission in a request indicating the set of selected values, as described above.

Process 700 may include additional aspects, such as any single aspect or any combination of aspects described below and/or in connection with one or more other processes described elsewhere herein.

In a first aspect, process 700 includes identifying an application operating on the UE as an active application, the application being one of the plurality of active applications, wherein the identification of the application as an active application comprises determining a characteristic of the application, and identifying the application as an active application based at least in part on the characteristic of the application.

In a second aspect, alone or in combination with the first aspect, the identification of the application as an active application based at least in part on the characteristic comprises determining that the characteristic associated with the application satisfies a threshold associated with the characteristic, and identifying the application as an active application based at least in part on the determination that the characteristic satisfies the threshold associated with the characteristic.

In a third aspect, alone or in combination with one or more of the first and second aspects, the characteristic includes a throughput associated with the application.

In a fourth aspect, alone or in combination with one or more of the first through third aspects, the characteristic includes a number of active intervals of the application.

In a fifth aspect, alone or in combination with one or more of the first through fourth aspects, the characteristic indicates a level of user interaction associated with the application.

In a sixth aspect, alone or in combination with one or more of the first through fifth aspects, the determination of the set of selected values for the C-DRX configuration parameters comprises identifying a maximum value for a first C-DRX configuration parameter among the sets of values, and determining a selected value for the first C-DRX configuration parameter as the maximum value for the first C-DRX configuration parameter.

In a seventh aspect, alone or in combination with one or more of the first through sixth aspects, the first C-DRX configuration parameter is an inactivity timer.

In an eighth aspect, alone or in combination with one or more of the first through seventh aspects, the determination of the set of selected values for the C-DRX configuration parameters comprises identifying a minimum value for a first C-DRX configuration parameter among the sets of values, and determining a selected value for the first C-DRX configuration parameter as the minimum value for the first C-DRX configuration parameter.

In a ninth aspect, alone or in combination with one or more of the first through eighth aspects, the first C-DRX configuration parameter is a duration of a long DRX cycle.

In a tenth aspect, alone or in combination with one or more of the first through ninth aspects, the determination of the set of selected values for the C-DRX configuration parameters comprises determining a selected value for a first C-DRX configuration parameter based at least in part on the sets of values, and determining a selected value for one or more other C-DRX configuration parameters based at least in part on a set of values that includes the selected value for the first C-DRX configuration parameter.

In an eleventh aspect, alone or in combination with one or more of the first through tenth aspects, the one or more other C-DRX configuration parameters include at least one of a duration of a short DRX cycle or a short DRX cycle timer.

In a twelfth aspect, alone or in combination with one or more of the first through eleventh aspects, the determination of the set of selected values for the C-DRX configuration parameters comprises identifying one or more active applications of the plurality of active applications that have a highest priority value, and determining the set of selected values based at least in part on one or more sets of values, of the sets of values, that correspond to the one or more active applications that have the highest priority value.

In a thirteenth aspect, alone or in combination with one or more of the first through twelfth aspects, the one or more sets of values include a single set of values, and the determination of the set of selected values is based at least in part on the single set of values.

In a fourteenth aspect, alone or in combination with one or more of the first through thirteenth aspects, the one or more sets of values include two or more sets of values, and the determination of the set of selected values is based at least in part on the two or more sets of values.

In a fifteenth aspect, alone or in combination with one or more of the first through fourteenth aspects, the determination of the set of selected values based at least in part on the two or more sets of values comprises determining a selected value for a first C-DRX configuration parameter as a maximum value for the first C-DRX configuration parameter among the two or more sets of values.

In a sixteenth aspect, alone or in combination with one or more of the first through fifteenth aspects, the determination of the set of selected values based at least in part on the two or more sets of values comprises determining a selected value for a first C-DRX configuration parameter as a minimum value for the first C-DRX configuration parameter among the two or more sets of values.

In a seventeenth aspect, alone or in combination with one or more of the first through sixteenth aspects, the determination of the set of selected values based at least in part on the two or more sets of values comprises determining a selected value for a first C-DRX configuration parameter based at least in part on the two or more sets of values, and determining a selected value for one or more other C-DRX configuration parameters based at least in part on a set of values, of the two or more sets of values, that includes the selected value for the first C-DRX configuration parameter.

In an eighteenth aspect, alone or in combination with one or more of the first through seventeenth aspects, the set of selected values is a set of default values for the C-DRX configuration parameters.

In a nineteenth aspect, alone or in combination with one or more of the first through eighteenth aspects, the set of default values is associated with at least one of a public land mobile network, a tracking area code, a cell identifier, or a location of the UE.

In a twentieth aspect, alone or in combination with one or more of the first through nineteenth aspects, the determination of the set of selected values for the C-DRX configuration parameters comprises determining a first set of values based at least in part on the sets of values, determining that the first set of values is not supported by a network associated with the UE, and determining the set of selected values to be a set of default values based at least in part on the determination that the first set of values is not supported by the network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
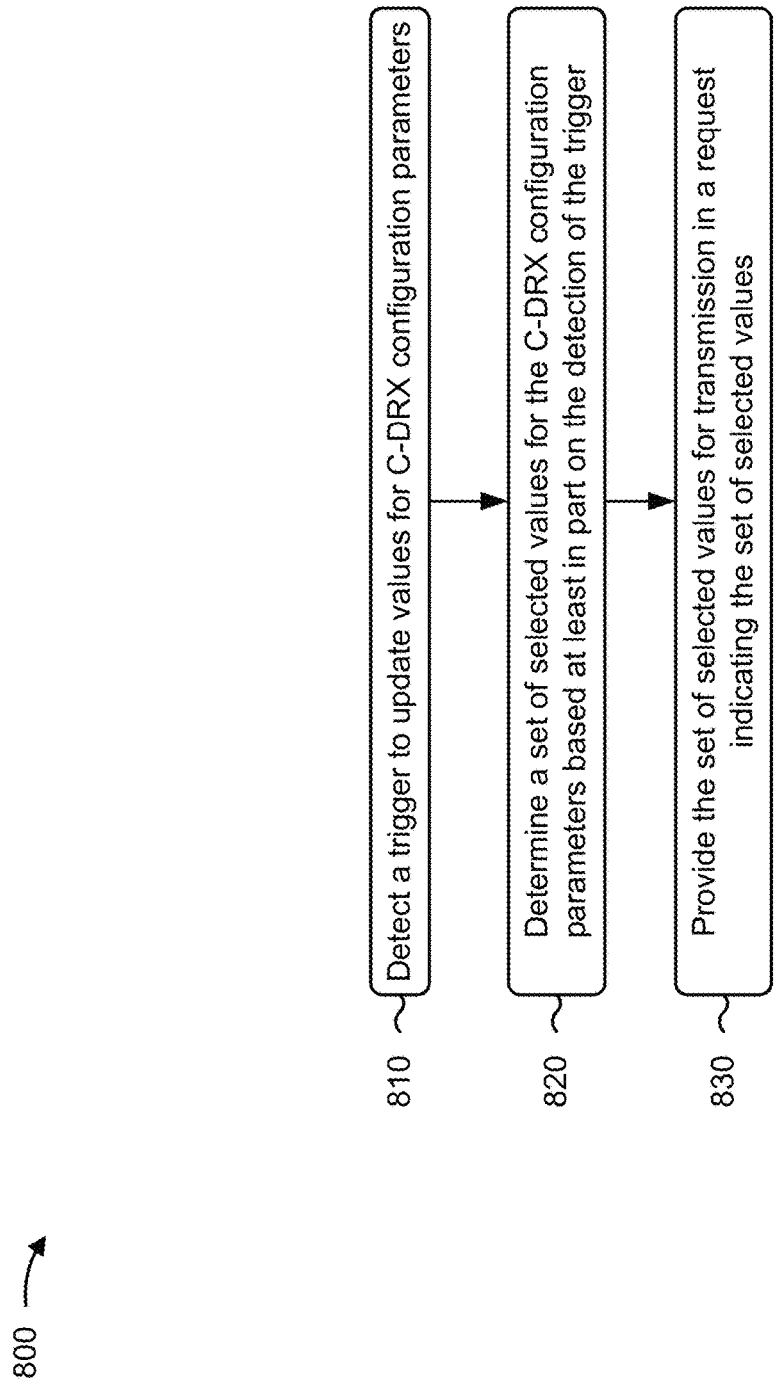

FIG. 8 is a diagram illustrating an example process 800 performed, for example, by a UE, in accordance with the present disclosure. Example process 800 is an example where the UE (e.g., UE 120) performs operations associated with UE determination of values for C-DRX configuration parameters.

As shown in FIG. 8, in some aspects, process 800 may include detecting a trigger to update values for C-DRX configuration parameters (block 810). For example, the UE (e.g., using detection component 1208) may detect a trigger to update values for C-DRX configuration parameters, as described above.

As further shown in FIG. 8, in some aspects, process 800 may include determining a set of selected values for the C-DRX configuration parameters based at least in part on the detection of the trigger (block 820). For example, the UE (e.g., using determination component 1210) may determine a set of selected values for the C-DRX configuration parameters based at least in part on the detection of the trigger, as described above.

As further shown in FIG. 8, in some aspects, process 800 may include providing the set of selected values for transmission in a request indicating the set of selected values (block 830). For example, the UE (e.g., using provision component 1212) may provide the set of selected values for transmission in a request indicating the set of selected values, as described above.

Process 800 may include additional aspects, such as any single aspect or any combination of aspects described below and/or in connection with one or more other processes described elsewhere herein.

In a first aspect, the trigger is a determination that no active applications are operating on the UE.

In a second aspect, alone or in combination with the first aspect, the determination of the set of selected values comprises determining a set of default values for the C-DRX configuration parameters based at least in part on the determination that no active applications are operating on the UE.

In a third aspect, alone or in combination with one or more of the first and second aspects, the set of default values is associated with at least one of a public land mobile network, a tracking area code, a cell identifier, or a location of the UE.

In a fourth aspect, alone or in combination with one or more of the first through third aspects, the trigger is a determination that an application operating on the UE has become an active application operating on the UE.

In a fifth aspect, alone or in combination with one or more of the first through fourth aspects, the determination of the set of selected values comprises recomputing a set of values for the C-DRX configuration parameters based at least in part on the determination that the application has become an active application.

In a sixth aspect, alone or in combination with one or more of the first through fifth aspects, the trigger is a determination that a state of an active application operating on the UE has changed from a first state to a second state.

In a seventh aspect, alone or in combination with one or more of the first through sixth aspects, the determination of the set of selected values comprises recomputing a set of values for the C-DRX configuration parameters based at least in part on the determination that the state of the active application has changed from the first state to the second state.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
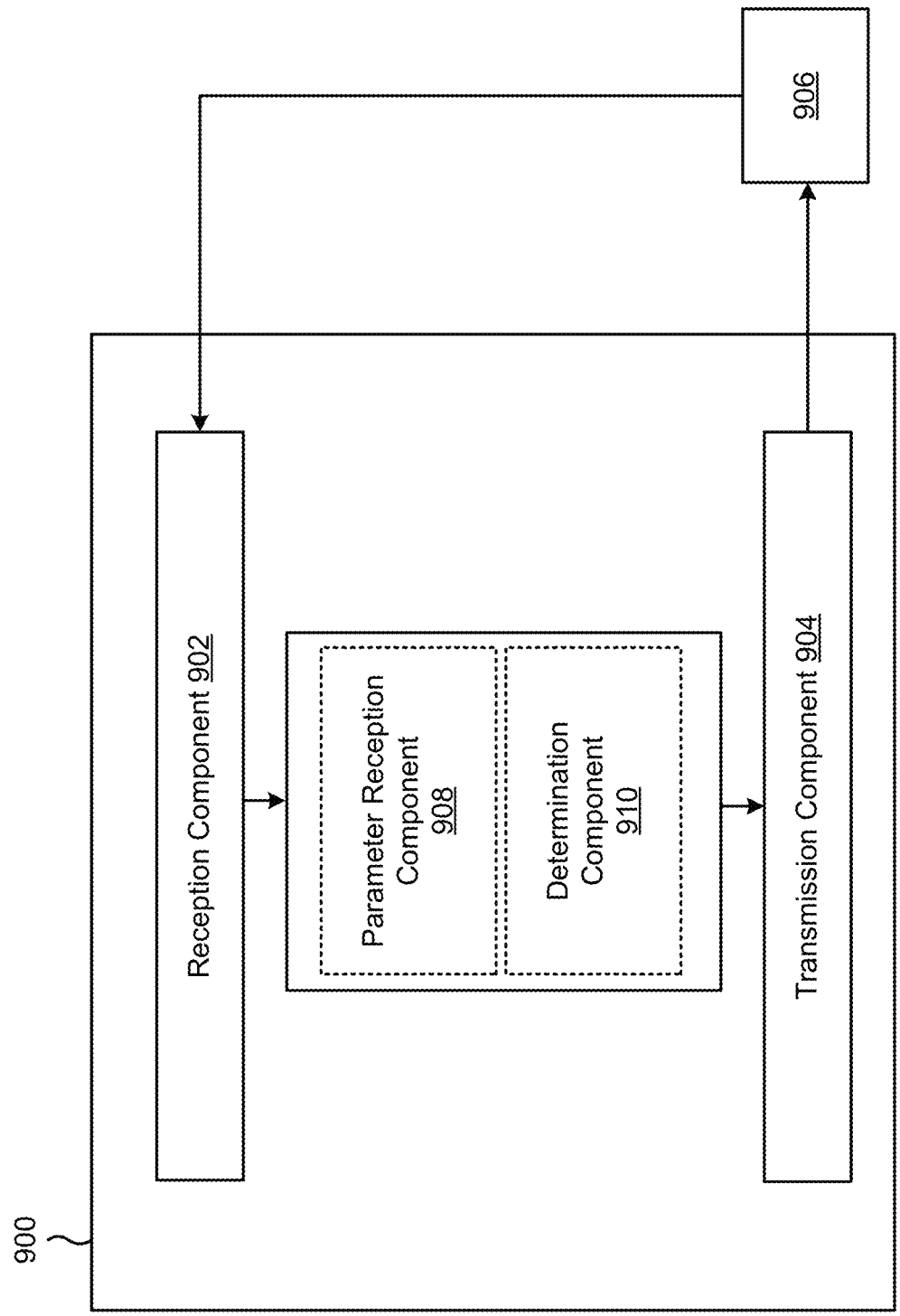
FIGS. 9-12 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a parameter reception component 908 and a determination component 910, among other examples.

In some aspects, the apparatus 900 may be configured to perform one or more operations described herein in connection with FIGS. 3A and 3B. Additionally, or alternatively, the apparatus 900 may be configured to perform one or more processes described herein, such as process 500 of FIG. 5. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The parameter reception component 908 may receive, at a modem from an application processor, sets of values for C-DRX configuration parameters, each of the sets of values for the C-DRX configuration parameters being associated with a corresponding one of a plurality of active applications operating on the UE. In some aspects, the parameter reception component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 910 may determine a set of selected values for the C-DRX configuration parameters based at least in part on the sets of values for the C-DRX configuration parameters. In some aspects, the determination of the set of selected values comprises identifying an extremum value for a first C-DRX configuration parameter among the sets of values, and determining a selected value for the first C-DRX configuration parameter as the extremum value for the first C-DRX configuration parameter. In some aspects, the determination component 910 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 904 may transmit a request indicating the set of selected values for the C-DRX configuration parameters.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
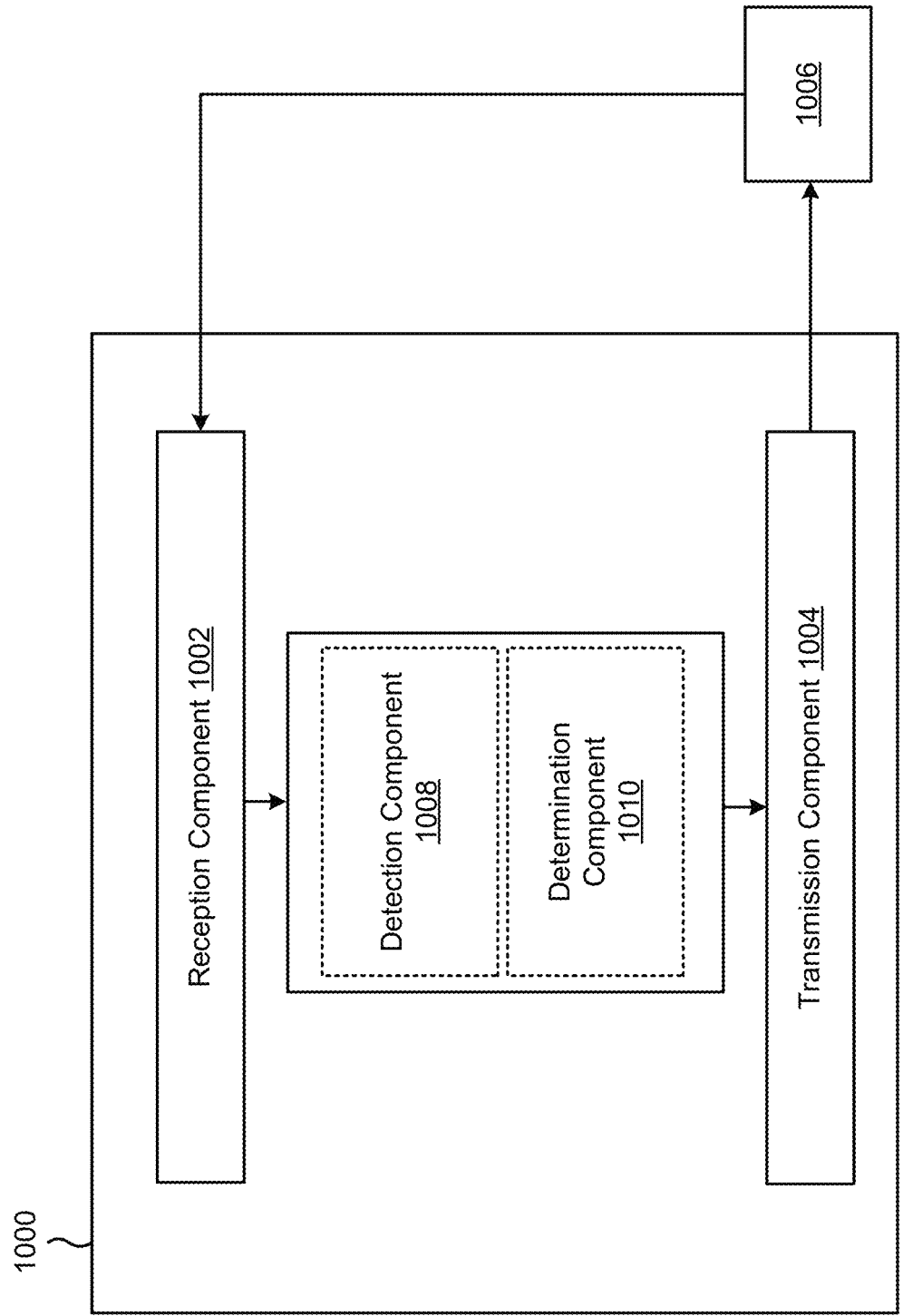

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a detection component 1008 and a determination component 1010, among other examples.

In some aspects, the apparatus 1000 may be configured to perform one or more operations described herein in connection with FIG. 4. Additionally, or alternatively, the apparatus 1000 may be configured to perform one or more processes described herein, such as process 600 of FIG. 6. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be collocated with the reception component 1002 in a transceiver.

The detection component 1008 may detect a trigger to update values for C-DRX configuration parameters. In some aspects, the detection component 1008 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 1010 may determine a set of selected values for the C-DRX configuration parameters based at least in part on the detection of the trigger. In some aspects, the determination component 1010 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1004 may transmit a request indicating the set of selected values for the C-DRX configuration parameters.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
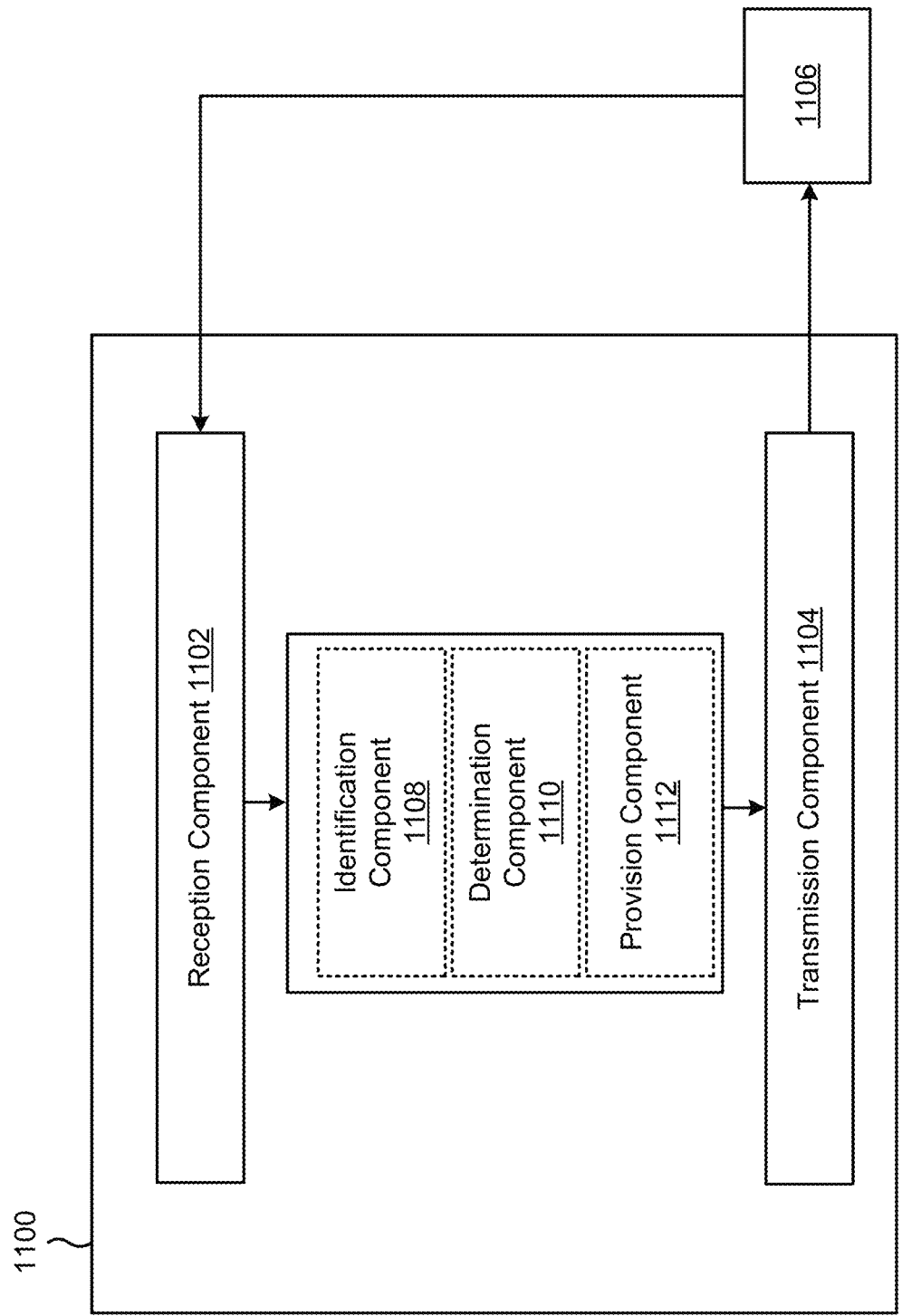

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of an identification component 1108, a determination component 1110, and a provision component 1112, among other examples.

In some aspects, the apparatus 1100 may be configured to perform one or more operations described herein in connection with FIGS. 3A and 3B. Additionally, or alternatively, the apparatus 1100 may be configured to perform one or more processes described herein, such as process 700 of FIG. 7. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The identification component 1108 may identify sets of values for C-DRX configuration parameters, each of the sets of values for the C-DRX configuration parameters being associated with a corresponding one of a plurality of active applications operating on the UE. In some aspects, the identification component 1108 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 1110 may determine a set of selected values for the C-DRX configuration parameters based at least in part on the sets of values for the C-DRX configuration parameters. In some aspects, the determination component 1110 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The provision component 1112 may provide the set of selected values for transmission in a request indicating the set of selected values for the C-DRX configuration parameters. In some aspects, the provision component 1112 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
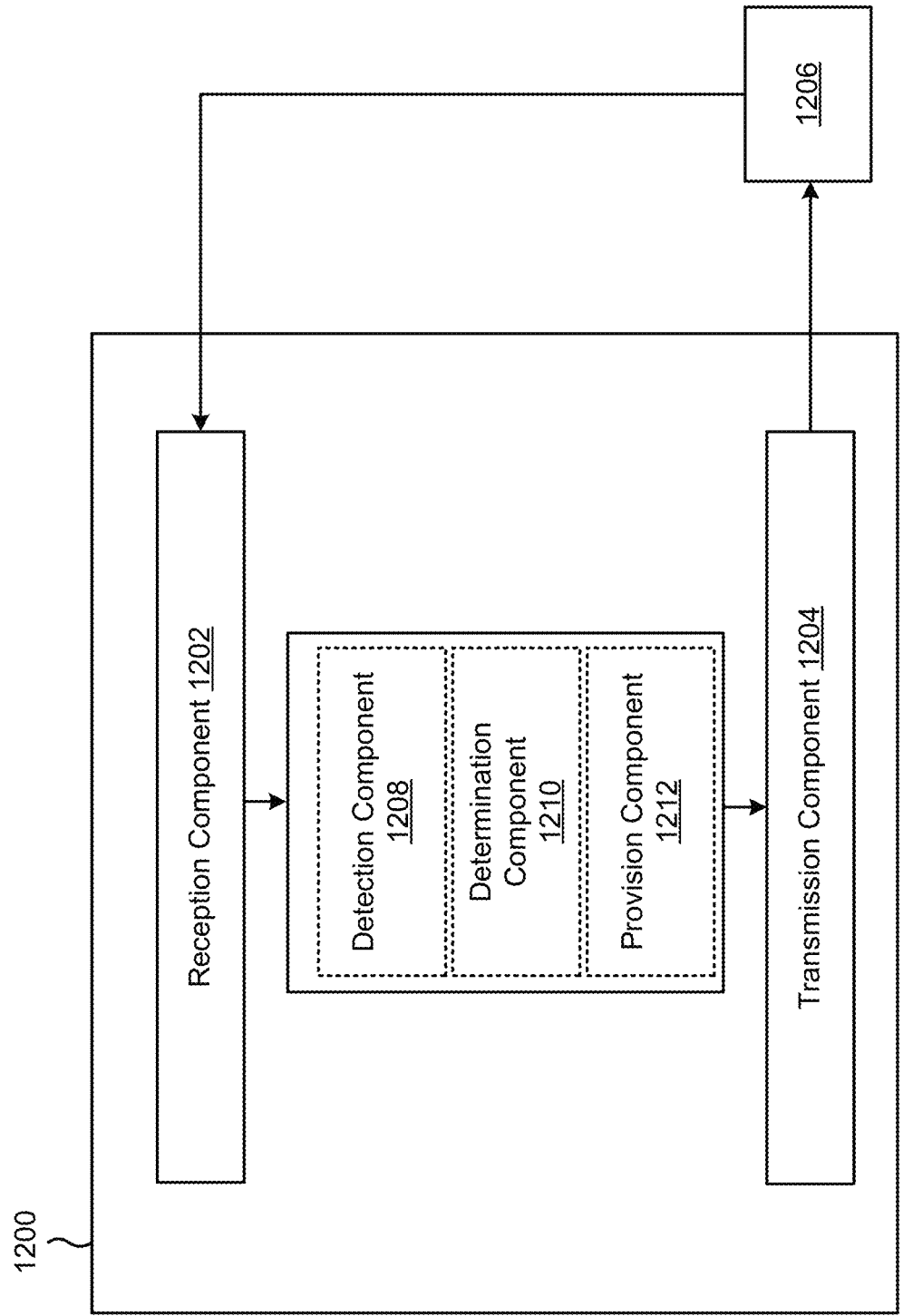

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a detection component 1208, a determination component 1210, and a provision component 1212, among other examples.

In some aspects, the apparatus 1200 may be configured to perform one or more operations described herein in connection with FIG. 4. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be collocated with the reception component 1202 in a transceiver.

The detection component 1208 may detect a trigger to update values for C-DRX configuration parameters. In some aspects, the detection component 1208 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 1210 may determine a set of selected values for the C-DRX configuration parameters based at least in part on the detection of the trigger. In some aspects, the determination component 1210 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The provision component 1212 may provide the set of selected values for the C-DRX configuration parameters for transmission in a request indicating the set of selected values for the C-DRX configuration parameters. In some aspects, the provision component 1212 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, at a modem from an application processor, sets of values for connected mode discontinuous reception (C-DRX) configuration parameters, each of the sets of values for the C-DRX configuration parameters being associated with a corresponding one of a plurality of active applications operating on the UE; determining a set of selected values for the C-DRX configuration parameters based at least in part on the sets of values for the C-DRX configuration parameters, wherein determining the set of selected values comprises: identifying an extremum value for a first C-DRX configuration parameter among the sets of values, and determining a selected value for the first C-DRX configuration parameter as the extremum value for the first C-DRX configuration parameter; and transmitting a request indicating the set of selected values for the C-DRX configuration parameters.

Aspect 2: The method of Aspect 1, further comprising identifying an application operating on the UE as an active application, the application being one of the plurality of active applications, wherein the identification of the application as an active application comprises: determining a characteristic of the application; and identifying the application as an active application based at least in part on the characteristic of the application.

Aspect 3: The method of Aspect 2, wherein the identification of the application as an active application based at least in part on the characteristic comprises: determining that the characteristic associated with the application satisfies a threshold associated with the characteristic; and identifying the application as an active application based at least in part on the determination that the characteristic satisfies the threshold associated with the characteristic.

Aspect 4: The method of Aspect 3, wherein the characteristic includes a throughput associated with the application.

Aspect 5: The method of any of Aspects 3-4, wherein the characteristic includes a number of active intervals of the application.

Aspect 6: The method of Aspect 2, wherein the characteristic indicates a level of user interaction associated with the application.

Aspect 7: The method of any of Aspects 1-6, wherein the extremum value for the first C-DRX configuration parameter among the sets of values is a maximum value for the first C-DRX configuration parameter among the sets of values.

Aspect 8: The method of Aspect 7, wherein the first C-DRX configuration parameter is an inactivity timer.

Aspect 9: The method of any of Aspects 1-8, wherein the extremum value for the first C-DRX configuration parameter among the sets of values is a minimum value for the first C-DRX configuration parameter among the sets of values.

Aspect 10: The method of Aspect 9, wherein the first C-DRX configuration parameter is a duration of a long DRX cycle.

Aspect 11: The method of any of Aspects 1-10, wherein the determination of the set of selected values for the C-DRX configuration parameters comprises: determining a selected value for one or more other C-DRX configuration parameters based at least in part on a set of values that includes the selected value for the first C-DRX configuration parameter.

Aspect 12: The method of Aspect 11, wherein the one or more other C-DRX configuration parameters include at least one of a duration of a short DRX cycle or a short DRX cycle timer.

Aspect 13: The method of any of Aspects 1-12, wherein the determination of the set of selected values for the C-DRX configuration parameters comprises: identifying one or more active applications of the plurality of active applications that have a highest priority value; and determining the set of selected values based at least in part on one or more sets of values, of the sets of values, that correspond to the one or more active applications that have the highest priority value.

Aspect 14: The method of Aspect 13, wherein the one or more sets of values include a single set of values, and the determination of the set of selected values is based at least in part on the single set of values.

Aspect 15: The method of Aspect 13, wherein the one or more sets of values include two or more sets of values, and the determination of the set of selected values is based at least in part on the two or more sets of values.

Aspect 16: The method of Aspect 15, wherein the determination of the set of selected values based at least in part on the two or more sets of values comprises: determining a selected value for a first C-DRX configuration parameter as a maximum value for the first C-DRX configuration parameter among the two or more sets of values.

Aspect 17: The method of any of Aspects 15-16, wherein the determination of the set of selected values based at least in part on the two or more sets of values comprises: determining a selected value for a first C-DRX configuration parameter as a minimum value for the first C-DRX configuration parameter among the two or more sets of values.

Aspect 18: The method of any of Aspects 15-17, wherein the determination of the set of selected values based at least in part on the two or more sets of values comprises: determining a selected value for a first C-DRX configuration parameter based at least in part on the two or more sets of values; and determining a selected value for one or more other C-DRX configuration parameters based at least in part on a set of values, of the two or more sets of values, that includes the selected value for the first C-DRX configuration parameter.

Aspect 19: The method of any of Aspects 1-18, wherein the set of selected values is a set of default values for the C-DRX configuration parameters.

Aspect 20: The method of Aspect 19, wherein the set of default values is associated with at least one of a public land mobile network, a tracking area code, a cell identifier, or a location of the UE.

Aspect 21: The method of any of Aspects 1-20, wherein the determination of the set of selected values for the C-DRX configuration parameters comprises: determining a first set of values based at least in part on the sets of values; determining that the first set of values is not supported by a network associated with the UE; and determining the set of selected values to be a set of default values based at least in part on the determination that the first set of values is not supported by the network.

Aspect 22: A method of wireless communication performed by a user equipment (UE), comprising: detecting a trigger to update values for connected mode discontinuous reception (C-DRX) configuration parameters; determining a set of selected values for the C-DRX configuration parameters based at least in part on the detection of the trigger; and transmitting a request indicating the set of selected values for the C-DRX configuration parameters.

Aspect 23: The method of Aspect 22, wherein the trigger is a determination that no active applications are operating on the UE.

Aspect 24: The method of Aspect 23, wherein the determination of the set of selected values comprises determining a set of default values for the C-DRX configuration parameters based at least in part on the determination that no active applications are operating on the UE.

Aspect 25: The method of Aspect 24, wherein the set of default values is associated with at least one of a public land mobile network, a tracking area code, a cell identifier, or a location of the UE.

Aspect 26: The method of Aspect 22, wherein the trigger is a determination that an application operating on the UE has become an active application operating on the UE.

Aspect 27: The method of Aspect 26, wherein the determination of the set of selected values comprises recomputing a set of values for the C-DRX configuration parameters based at least in part on the determination that the application has become an active application.

Aspect 28: The method of Aspect 22, wherein the trigger is a determination that a state of an active application operating on the UE has changed from a first state to a second state.

Aspect 29: The method of Aspect 28, wherein the determination of the set of selected values comprises recomputing a set of values for the C-DRX configuration parameters based at least in part on the determination that the state of the active application has changed from the first state to the second state.

Aspect 30: A method of wireless communication performed by a user equipment (UE), comprising: identifying sets of values for connected mode discontinuous reception (C-DRX) configuration parameters, each of the sets of values for the C-DRX configuration parameters being associated with a corresponding one of a plurality of active applications operating on the UE; determining a set of selected values for the C-DRX configuration parameters based at least in part on the sets of values for the C-DRX configuration parameters; and providing the set of selected values for transmission in a request indicating the set of selected values.

Aspect 31: The method of Aspect 30, further comprising identifying an application operating on the UE as an active application, the application being one of the plurality of active applications, wherein the identification of the application as an active application comprises: determining a characteristic of the application; and identifying the application as an active application based at least in part on the characteristic of the application.

Aspect 32: The method of Aspect 31, wherein the identification of the application as an active application based at least in part on the characteristic comprises: determining that the characteristic associated with the application satisfies a threshold associated with the characteristic; and identifying the application as an active application based at least in part on the determination that the characteristic satisfies the threshold associated with the characteristic.

Aspect 33: The method of Aspect 32, wherein the characteristic includes a throughput associated with the application.

Aspect 34: The method of any of Aspects 32-33, wherein the characteristic includes a number of active intervals of the application.

Aspect 35: The method of Aspect 31, wherein the characteristic indicates a level of user interaction associated with the application.

Aspect 36: The method of any of Aspects 30-35, wherein the determination of the set of selected values for the C-DRX configuration parameters comprises: identifying a maximum value for a first C-DRX configuration parameter among the sets of values; and determining a selected value for the first C-DRX configuration parameter as the maximum value for the first C-DRX configuration parameter.

Aspect 37: The method of Aspect 36, wherein the first C-DRX configuration parameter is an inactivity timer.

Aspect 38: The method of any of Aspects 30-37, wherein the determination of the set of selected values for the C-DRX configuration parameters comprises: identifying a minimum value for a first C-DRX configuration parameter among the sets of values; and determining a selected value for the first C-DRX configuration parameter as the minimum value for the first C-DRX configuration parameter.

Aspect 39: The method of Aspect 38, wherein the first C-DRX configuration parameter is a duration of a long DRX cycle.

Aspect 40: The method of any of Aspects 30-39, wherein the determination of the set of selected values for the C-DRX configuration parameters comprises: determining a selected value for a first C-DRX configuration parameter based at least in part on the sets of values; and determining a selected value for one or more other C-DRX configuration parameters based at least in part on a set of values that includes the selected value for the first C-DRX configuration parameter.

Aspect 41: The method of Aspect 40, wherein the one or more other C-DRX configuration parameters include at least one of a duration of a short DRX cycle or a short DRX cycle timer.

Aspect 42: The method of any of Aspects 30-41, wherein the determination of the set of selected values for the C-DRX configuration parameters comprises: identifying one or more active applications of the plurality of active applications that have a highest priority value; and determining the set of selected values based at least in part on one or more sets of values, of the sets of values, that correspond to the one or more active applications that have the highest priority value.

Aspect 43: The method of Aspect 42, wherein the one or more sets of values include a single set of values, and the determination of the set of selected values is based at least in part on the single set of values.

Aspect 44: The method of Aspect 42, wherein the one or more sets of values include two or more sets of values, and the determination of the set of selected values is based at least in part on the two or more sets of values.

Aspect 45: The method of Aspect 44, wherein the determination of the set of selected values based at least in part on the two or more sets of values comprises: determining a selected value for a first C-DRX configuration parameter as a maximum value for the first C-DRX configuration parameter among the two or more sets of values.

Aspect 46: The method of any of Aspects 44-45, wherein the determination of the set of selected values based at least in part on the two or more sets of values comprises: determining a selected value for a first C-DRX configuration parameter as a minimum value for the first C-DRX configuration parameter among the two or more sets of values.

Aspect 47: The method of any of Aspects 44-46, wherein the determination of the set of selected values based at least in part on the two or more sets of values comprises: determining a selected value for a first C-DRX configuration parameter based at least in part on the two or more sets of values; and determining a selected value for one or more other C-DRX configuration parameters based at least in part on a set of values, of the two or more sets of values, that includes the selected value for the first C-DRX configuration parameter.

Aspect 48: The method of any of Aspects 30-47, wherein the set of selected values is a set of default values for the C-DRX configuration parameters.

Aspect 49: The method of Aspect 48, wherein the set of default values is associated with at least one of a public land mobile network, a tracking area code, a cell identifier, or a location of the UE.

Aspect 50: The method of any of Aspects 30-49, wherein the determination of the set of selected values for the C-DRX configuration parameters comprises: determining a first set of values based at least in part on the sets of values; determining that the first set of values is not supported by a network associated with the UE; and determining the set of selected values to be a set of default values based at least in part on the determination that the first set of values is not supported by the network.

Aspect 51: A method of wireless communication performed by a user equipment (UE), comprising: detecting a trigger to update values for connected mode discontinuous reception (C-DRX) configuration parameters; determining a set of selected values for the C-DRX configuration parameters based at least in part on the detection of the trigger; and providing the set of selected values for transmission in a request indicating the set of selected values.

Aspect 52: The method of Aspect 51, wherein the trigger is a determination that no active applications are operating on the UE.

Aspect 53: The method of Aspect 52, wherein the determination of the set of selected values comprises determining a set of default values for the C-DRX configuration parameters based at least in part on the determination that no active applications are operating on the UE.

Aspect 54: The method of Aspect 53, wherein the set of default values is associated with at least one of a public land mobile network, a tracking area code, a cell identifier, or a location of the UE.

Aspect 55: The method of Aspect 51, wherein the trigger is a determination that an application operating on the UE has become an active application operating on the UE.

Aspect 56: The method of Aspect 55, wherein the determination of the set of selected values comprises recomputing a set of values for the C-DRX configuration parameters based at least in part on the determination that the application has become an active application.

Aspect 57: The method of Aspect 51, wherein the trigger is a determination that a state of an active application operating on the UE has changed from a first state to a second state.

Aspect 58: The method of Aspect 57, wherein the determination of the set of selected values comprises recomputing a set of values for the C-DRX configuration parameters based at least in part on the determination that the state of the active application has changed from the first state to the second state.

Aspect 59: An apparatus for wireless communication at a device, comprising a processor; memory coupled with the processor; and instructions stored in the memory and executable by the processor to cause the apparatus to perform the method of one or more of Aspects 1-21.

Aspect 60: A device for wireless communication, comprising a memory and one or more processors coupled to the memory, the one or more processors configured to perform the method of one or more of Aspects 1-21.

Aspect 61: An apparatus for wireless communication, comprising at least one means for performing the method of one or more of Aspects 1-21.

Aspect 62: A non-transitory computer-readable medium storing code for wireless communication, the code comprising instructions executable by a processor to perform the method of one or more of Aspects 1-21.

Aspect 63: A non-transitory computer-readable medium storing a set of instructions for wireless communication, the set of instructions comprising one or more instructions that, when executed by one or more processors of a device, cause the device to perform the method of one or more of Aspects 1-21.

Aspect 64: An apparatus for wireless communication at a device, comprising a processor; memory coupled with the processor; and instructions stored in the memory and executable by the processor to cause the apparatus to perform the method of one or more of Aspects 22-29.

Aspect 65: A device for wireless communication, comprising a memory and one or more processors coupled to the memory, the one or more processors configured to perform the method of one or more of Aspects 22-29.

Aspect 66: An apparatus for wireless communication, comprising at least one means for performing the method of one or more of Aspects 22-29.

Aspect 67: A non-transitory computer-readable medium storing code for wireless communication, the code comprising instructions executable by a processor to perform the method of one or more of Aspects 22-29.

Aspect 68: A non-transitory computer-readable medium storing a set of instructions for wireless communication, the set of instructions comprising one or more instructions that, when executed by one or more processors of a device, cause the device to perform the method of one or more of Aspects 22-29.

Aspect 69: An apparatus for wireless communication at a device, comprising a processor; memory coupled with the processor; and instructions stored in the memory and executable by the processor to cause the apparatus to perform the method of one or more of Aspects 30-50.

Aspect 70: A device for wireless communication, comprising a memory and one or more processors coupled to the memory, the one or more processors configured to perform the method of one or more of Aspects 30-50.

Aspect 71: An apparatus for wireless communication, comprising at least one means for performing the method of one or more of Aspects 30-50.

Aspect 72: A non-transitory computer-readable medium storing code for wireless communication, the code comprising instructions executable by a processor to perform the method of one or more of Aspects 30-50.

Aspect 73: A non-transitory computer-readable medium storing a set of instructions for wireless communication, the set of instructions comprising one or more instructions that, when executed by one or more processors of a device, cause the device to perform the method of one or more of Aspects 30-50.

Aspect 74: An apparatus for wireless communication at a device, comprising a processor; memory coupled with the processor; and instructions stored in the memory and executable by the processor to cause the apparatus to perform the method of one or more of Aspects 51-58.

Aspect 75: A device for wireless communication, comprising a memory and one or more processors coupled to the memory, the one or more processors configured to perform the method of one or more of Aspects 51-58.

Aspect 76: An apparatus for wireless communication, comprising at least one means for performing the method of one or more of Aspects 51-58.

Aspect 77: A non-transitory computer-readable medium storing code for wireless communication, the code comprising instructions executable by a processor to perform the method of one or more of Aspects 51-58.

Aspect 78: A non-transitory computer-readable medium storing a set of instructions for wireless communication, the set of instructions comprising one or more instructions that, when executed by one or more processors of a device, cause the device to perform the method of one or more of Aspects 51-58.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, at a modem from an application processor, sets of values for connected mode discontinuous reception (C-DRX) configuration parameters, each of the sets of values for the C-DRX configuration parameters being associated with a corresponding one of a plurality of active applications operating on the UE;
   identifying a set of selected values for the C-DRX configuration parameters based at least in part on the sets of values for the C-DRX configuration parameters, wherein identifying the set of selected values comprises:
      identifying an extremum value for a first C-DRX configuration parameter from among the sets of values for the C-DRX configuration parameters, the extremum value comprising a maximum value or a minimum value from among the sets of values for the C-DRX configuration parameters, and
      identifying a selected value for the first C-DRX configuration parameter as the extremum value for the first C-DRX configuration parameter; and
   transmitting a request indicating the set of selected values for the C-DRX configuration parameters.

2. The method of claim 1, further comprising:
   determining a characteristic of an application of the plurality of active applications; and
   identifying the application as an active application based at least in part on the characteristic of the application.

3. The method of claim 2, wherein the identification of the application as the active application based at least in part on the characteristic comprises:
   determining that the characteristic satisfies a threshold associated with the characteristic; and
   identifying the application as the active application based at least in part on the determination that the characteristic satisfies the threshold associated with the characteristic.

4. The method of claim 3, wherein the characteristic includes a throughput associated with the application.

5. The method of claim 3, wherein the characteristic includes a number of active intervals of the application.

6. The method of claim 2, wherein the characteristic indicates a level of user interaction associated with the application.

7. The method of claim 1, wherein the extremum value is the maximum value among the sets of values for the C-DRX configuration parameters, and the maximum value is for an inactivity timer.

8. The method of claim 1, wherein the extremum value is the minimum value among the sets of values for the C-DRX configuration parameters, and the minimum value is for a long cycle duration.

9. The method of claim 1, further comprising:
   identifying a selected value for one or more other C-DRX configuration parameters from the set of values for the C-DRX configuration parameters that includes the extremum value.

10. The method of claim 9, wherein the one or more other C-DRX configuration parameters include at least one of a duration of a short DRX cycle or a short DRX cycle timer.

11. The method of claim 1, wherein the set of selected values is a set of default values for the C-DRX configuration parameters.

12. The method of claim 11, wherein the set of default values is associated with at least one of a public land mobile network, a tracking area code, a cell identifier, or a location of the UE.

13. The method of claim 1, wherein the identification of the set of selected values for the C-DRX configuration parameters comprises:
   determining a first set of values based at least in part on the sets of values for the C-DRX configuration parameters;
   determining that the first set of values is not supported by a network associated with the UE; and
   determining the set of selected values to be a set of default values based at least in part on the determination that the first set of values is not supported by the network.

14. A user equipment (UE) for wireless communication, comprising:
   one or more memories; and
   one or more processors coupled to the memory, the one or more memories and the one or more processors configured to:
      receive, at a modem from an application processor, sets of values for connected mode discontinuous reception (C-DRX) configuration parameters, each of the sets of values for the C-DRX configuration parameters being associated with a corresponding one of a plurality of active applications operating on the UE;
      identify a set of selected values for the C-DRX configuration parameters based at least in part on the sets of values for the C-DRX configuration parameters, wherein the one or more processors, to identify the set of selected values, are configured to:
         identify an extremum value for a first C-DRX configuration parameter from among the sets of values for the C-DRX configuration parameters, the extremum value comprising a maximum value or a minimum value from among the sets of values for the C-DRX configuration parameters, and
         identify a selected value for the first C-DRX configuration parameter as the extremum value for the first C-DRX configuration parameter; and
      transmit a request indicating the set of selected values for the C-DRX configuration parameters.

15. The UE of claim 14, wherein the one or more processors are further configured to:
   determine a characteristic of an application of the plurality of active applications; and
   identify the application as an active application based at least in part on the characteristic of the application.

16. The UE of claim 15, wherein the one or more processors, to identify the application as the active application based at least in part on the characteristic, are configured to:
   determine that the characteristic satisfies a threshold associated with the characteristic; and
   identify the application as the active application based at least in part on the determination that the characteristic satisfies the threshold associated with the characteristic.

17. The UE of claim 16, wherein the characteristic includes at least one of a throughput associated with the application, a number of active intervals of the application, or a level of user interaction associated with the application.

18. The UE of claim 14, wherein the extremum value is the maximum value among the sets of values for the C-DRX configuration parameters, and the maximum value is for an inactivity timer.

19. The UE of claim 14, wherein the extremum value is the minimum value among the sets of values for the C-DRX configuration parameters, and the minimum value is for a long cycle duration.

20. The UE of claim 14, wherein the one or more processors are further configured to:
identify a selected value for one or more other C-DRX configuration parameters from the set of values for the C-DRX configuration parameters that includes the extremum value.

21. The UE of claim 20, wherein the one or more other C-DRX configuration parameters include at least one of a duration of a short DRX cycle or a short DRX cycle timer.

22. The UE of claim 14, wherein the set of selected values is a set of default values for the C-DRX configuration parameters.

23. The UE of claim 22, wherein the set of default values is associated with at least one of a public land mobile network, a tracking area code, a cell identifier, or a location of the UE.

24. The UE of claim 14, wherein the one or more processors, to identify the set of selected values for the C-DRX configuration parameters, are configured to:
determine a first set of values based at least in part on the sets of values for the C-DRX configuration parameters;
determine that the first set of values is not supported by a network associated with the UE; and
determine the set of selected values to be a set of default values based at least in part on the determination that the first set of values is not supported by the network.

25. A non-transitory computer-readable medium storing one or more instructions for wireless communication, the one or more instructions comprising:
one or more instructions that, when executed by one or more processors of a user equipment (UE), cause the UE to:
identify sets of values for connected mode discontinuous reception (C-DRX) configuration parameters, each of the sets of values for the C-DRX configuration parameters being associated with a corresponding one of a plurality of active applications operating on the UE;
identify a set of selected values for the C-DRX configuration parameters based at least in part on the sets of values for the C-DRX configuration parameters, wherein the one or more instructions, that cause the UE to determine identify the set of selected values, cause the UE to:
identify an extremum value for a first C-DRX configuration parameter from among the sets of values for the C-DRX configuration parameters, the extremum value comprising a maximum value or a minimum value from among the sets of values for the C-DRX configuration parameters, and
identify a selected value for the first C-DRX configuration parameter as the extremum value for the first C-DRX configuration parameter; and
transmit a request indicating the set of selected values for the C-DRX configuration parameters.

26. The non-transitory computer-readable medium of claim 25, wherein the extremum value is the maximum value among the sets of values for the C-DRX configuration parameters, and the maximum value is for an inactivity timer.

27. The non-transitory computer-readable medium of claim 25, wherein the extremum value is the minimum value among the sets of values for the C-DRX configuration parameters, and the minimum value is for a long cycle duration.

28. An apparatus for wireless communication, comprising:
means for identifying sets of values for connected mode discontinuous reception (C-DRX) configuration parameters, each of the sets of values for the C-DRX configuration parameters being associated with a corresponding one of a plurality of active applications operating on the apparatus;
means for identifying a set of selected values for the C-DRX configuration parameters based at least in part on the sets of values for the C-DRX configuration parameters, wherein the means for identifying the set of selected values comprises:
means for identifying an extremum value for a first C-DRX configuration from parameter among the sets of values for the C-DRX configuration parameters, the extremum value comprising a maximum value or a minimum value from among the sets of values for the C-DRX configuration parameters, and
means for identifying a selected value for the first C-DRX configuration parameter as the extremum value for the first C-DRX configuration parameter; and
means for transmitting a request indicating the set of selected values for the C-DRX configuration parameters.

29. The apparatus of claim 28, wherein the extremum value is the maximum value among the sets of values for the C-DRX configuration parameters, and the maximum value is for an inactivity timer.

30. The apparatus of claim 28, wherein the extremum value is the minimum value among the sets of values for the C-DRX configuration parameters, and the minimum value is for a long cycle duration.

* * * * *